US012763253B2

(12) United States Patent
Kitamura

(10) Patent No.: US 12,763,253 B2
(45) Date of Patent: Oct. 13, 2026

(54) CERAMIC ELECTRONIC DEVICE PROVIDED WITH MULTILAYER CHIP HAVING INTERNAL ELECTRODE LAYERS AN EXTERNAL ELECTRODES BOTH CONTAINING SUB METAL ELEMENT AND MANUFACTURING METHOD OF THE SAME

(71) Applicant: TAIYO YUDEN CO., LTD., Tokyo (JP)

(72) Inventor: Shohei Kitamura, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 150 days.

(21) Appl. No.: 18/183,093

(22) Filed: Mar. 13, 2023

(65) Prior Publication Data

US 2023/0298816 A1 Sep. 21, 2023

(30) Foreign Application Priority Data

Mar. 17, 2022 (JP) ................................ 2022-042653
Mar. 17, 2022 (JP) ................................ 2022-042654

(51) Int. Cl.
*H01G 4/008* (2006.01)
*H01G 4/012* (2006.01)
(Continued)

(52) U.S. Cl.
CPC ........... *H01G 4/0085* (2013.01); *H01G 4/012* (2013.01); *H01G 4/2325* (2013.01); *H01G 4/30* (2013.01)

(58) Field of Classification Search
CPC .... H01G 4/0085; H01G 4/012; H01G 4/2325; H01G 4/30; H01G 4/008; H01G 4/232
See application file for complete search history.

(56) References Cited

U.S. PATENT DOCUMENTS 4,701,827 A * 10/1987 Fujikawa ............... H01G 4/008 361/309
2004/0256603 A1* 12/2004 Celik .................. H01G 4/0085 252/500
(Continued)

FOREIGN PATENT DOCUMENTS

JP H07201637 A 8/1995
JP 2001307941 A 11/2001
(Continued)

OTHER PUBLICATIONS

A Notice of Reasons for Refusal issued by the Japanese Patent Office, mailed Feb. 17, 2026, for Japanese related application No. 2022-042653. (4 pages).
(Continued)

*Primary Examiner* — Timothy J. Dole
(74) *Attorney, Agent, or Firm* — Law Office of Katsuhiro Arai

(57) ABSTRACT

A ceramic electronic device includes a multilayer chip in which each of a plurality of dielectric layers of which a main component is a ceramic and each of a plurality of internal electrode layers including Ni as a main component are alternately stacked, the multilayer chip having a rectangular parallelepiped shape, each of the plurality of internal electrode layers being exposed to two end faces opposite to each other; and external electrodes that are respectively provided on the two end faces and have a main component of Ni. The plurality of internal electrode layers include a sub metal element other than Ni, and co-materials. A concentration of the sub metal element in the plurality of internal electrode layers is higher than that in the external electrodes.

10 Claims, 15 Drawing Sheets

(51) Int. Cl.
*H01G 4/232* (2006.01)
*H01G 4/30* (2006.01)

(56) References Cited

U.S. PATENT DOCUMENTS

| | | | | |
|---|---|---|---|---|
| 2006/0138590 | A1* | 6/2006 | Suzuki | H01G 4/306 257/532 |
| 2008/0212258 | A1* | 9/2008 | Fukui | H01G 4/30 29/25.42 |
| 2009/0067117 | A1* | 3/2009 | Kasuya | H01G 4/30 156/89.18 |
| 2013/0049532 | A1 | 2/2013 | Kim et al. | |
| 2013/0063862 | A1* | 3/2013 | Kim | H01G 4/30 156/182 |
| 2013/0286539 | A1 | 10/2013 | Kim et al. | |
| 2013/0321980 | A1* | 12/2013 | Suzuki | H01G 4/1227 29/25.42 |
| 2014/0104748 | A1 | 4/2014 | Park et al. | |
| 2014/0126109 | A1 | 5/2014 | Kim et al. | |
| 2014/0240898 | A1 | 8/2014 | Kim et al. | |
| 2015/0155098 | A1* | 6/2015 | Yamaguchi | H01G 13/00 156/89.16 |
| 2018/0108483 | A1 | 4/2018 | Sasabayashi et al. | |
| 2018/0336998 | A1* | 11/2018 | Kitamura | H01G 4/012 |
| 2018/0336999 | A1 | 11/2018 | Kitamura | |
| 2019/0244758 | A1* | 8/2019 | Oshima | H01G 4/1245 |
| 2019/0304695 | A1 | 10/2019 | Kim et al. | |
| 2020/0058442 | A1* | 2/2020 | Cha | H01G 4/12 |
| 2020/0335280 | A1* | 10/2020 | Tanaka | H01G 4/0085 |
| 2021/0027948 | A1* | 1/2021 | Kim | H01G 4/008 |
| 2021/0202172 | A1* | 7/2021 | Kanzaki | H01G 4/012 |
| 2021/0280370 | A1 | 9/2021 | Kitamura | |
| 2022/0157523 | A1* | 5/2022 | Lee | H01G 4/0085 |
| 2023/0108431 | A1* | 4/2023 | Lee | H01G 4/012 361/301.4 |
| 2024/0006124 | A1* | 1/2024 | Yamaguchi | H01G 4/0085 |

FOREIGN PATENT DOCUMENTS

| | | | |
|---|---|---|---|
| JP | 2002343669 | A | 11/2002 |
| JP | 2003309037 | A | 10/2003 |
| JP | 2007242599 | A | 9/2007 |
| JP | 2013055314 | A | 3/2013 |
| JP | 2013229555 | A | 11/2013 |
| JP | 2014082435 | A | 5/2014 |
| JP | 2014093516 | A | 5/2014 |
| JP | 2014170911 | A | 9/2014 |
| JP | 2018067568 | A | 4/2018 |
| JP | 2018195799 | A | 12/2018 |
| JP | 2019176117 | A | 10/2019 |
| JP | 2021100021 | A | 7/2021 |
| JP | 2021103711 | A | 7/2021 |
| JP | 2021141131 | A | 9/2021 |

OTHER PUBLICATIONS

A Notice of Reasons for Refusal issued by the Japanese Patent Office, mailed Feb. 17, 2026, for Japanese related application No. 2022-042654. (6 pages).

* cited by examiner

CERAMIC ELECTRONIC DEVICE PROVIDED WITH MULTILAYER CHIP HAVING INTERNAL ELECTRODE LAYERS AN EXTERNAL ELECTRODES BOTH CONTAINING SUB METAL ELEMENT AND MANUFACTURING METHOD OF THE SAME

CROSS-REFERENCE TO RELATED APPLICATION

This application is based upon and claims the benefit of priority of the prior Japanese Patent Application No. 2022-042653, filed on Mar. 17, 2022 and the prior Japanese Patent Application No. 2022-042654, filed on Mar. 17, 2022, the entire contents of which are incorporated herein by reference.

FIELD

A certain aspect of the present invention relates to a ceramic electronic device and a manufacturing method of the ceramic electronic device.

BACKGROUND

Demands for miniaturization and large-capacity ceramic electronic components such as multilayer ceramic capacitors which are one of component parts continue to increase as a capacity of a battery increases in addition to multi-function and high performance of mobile terminals or other electronic devices which are represented by mobile phones.

SUMMARY OF THE INVENTION

According to an aspect of the present invention, there is provided a ceramic electronic device including: a multilayer chip in which each of a plurality of dielectric layers of which a main component is a ceramic and each of a plurality of internal electrode layers including Ni as a main component are alternately stacked, the multilayer chip having a rectangular parallelepiped shape, each of the plurality of internal electrode layers being exposed to two end faces opposite to each other; and external electrodes that are respectively provided on the two end faces and have a main component of Ni, wherein the plurality of internal electrode layers include a sub metal element other than Ni, and co-materials, and wherein a concentration of the sub metal element in the plurality of internal electrode layers is higher than that in the external electrodes.

According to another aspect of the present invention, there is provided a manufacturing method of a ceramic electronic device including: forming ceramic multilayer structure by alternately stacking each of a plurality of dielectric green sheets and each of a plurality of internal electrode patterns, the each of a plurality of dielectric green sheets including a ceramic powder, the each of a plurality of internal electrode patterns including Ni acting as a main component metal, co-materials and a sub metal element, and by making the plurality of internal electrode patterns alternately exposed to two end faces of the ceramic multilayer structure opposite to each other; applying a metal paste on the two end faces, a main component metal of the metal paste being Ni; and firing the ceramic multilayer structure so that a concentration of the sub metal element in internal electrode layers formed from the plurality of internal electrode patterns is higher than that in external electrodes formed from the metal paste.

According to an aspect of the present invention, there is provided a ceramic electronic device including: a multilayer chip in which each of a plurality of dielectric layers of which a main component is a ceramic and each of a plurality of internal electrode layers including Ni as a main component are alternately stacked, the multilayer chip having a rectangular parallelepiped shape, each of the plurality of internal electrode layers being exposed to two end faces opposite to each other; and external electrodes that are respectively provided on the two end faces, have a main component of Ni, and include a sub metal element other than Ni, and co-materials, wherein a concentration of the sub metal element in the external electrodes is higher than that in the plurality of internal electrode layers.

According to another aspect of the present invention, there is provided a manufacturing method of a ceramic electronic device including: forming ceramic multilayer structure by alternately stacking each of a plurality of dielectric green sheets including a ceramic powder and each of a plurality of internal electrode patterns including Ni acting as a main component metal, and making the plurality of internal electrode patterns alternately exposed to two end faces of the ceramic multilayer structure opposite to each other; applying a metal paste on the two end faces, a main component metal of the metal paste being Ni, the metal paste including a sub metal element other than Ni, and co-materials; and firing the ceramic multilayer structure so that a concentration of the sub metal element in external electrodes formed from the metal paste is higher than that in internal electrode layers formed from the internal electrode patterns.

DETAILED DESCRIPTION

Regarding the increase in capacity of ceramic electronic devices, measures such as material composition studies to increase the dielectric constant of the dielectric materials and thinning of dielectric layers are being taken. It is also an effective means to increase the number of layers by thinning the internal electrode layers. However, when the internal electrode layers are made thinner, the densification temperature range differs between the dielectric layers and the internal electrode layers during the firing process. In this case, the internal electrode layer may be excessively sintered, and a continuity modulus of the internal electrode layer may be degraded. Thus, the bondability between the internal electrode layers and the external electrodes may deteriorate, and desired characteristics may not be necessarily achieved.

When the external electrode and the dielectric layer are fired at the same time, the dielectric layer and the external electrode have different densification temperature ranges during the firing process. In this case, the external electrodes may be excessively sintered and contract. Thus, the bondability between the layer and the external electrode may deteriorate, and desired characteristics may not be necessarily obtained.

A description will be given of an embodiment with reference to the accompanying drawings.

Figure 1:
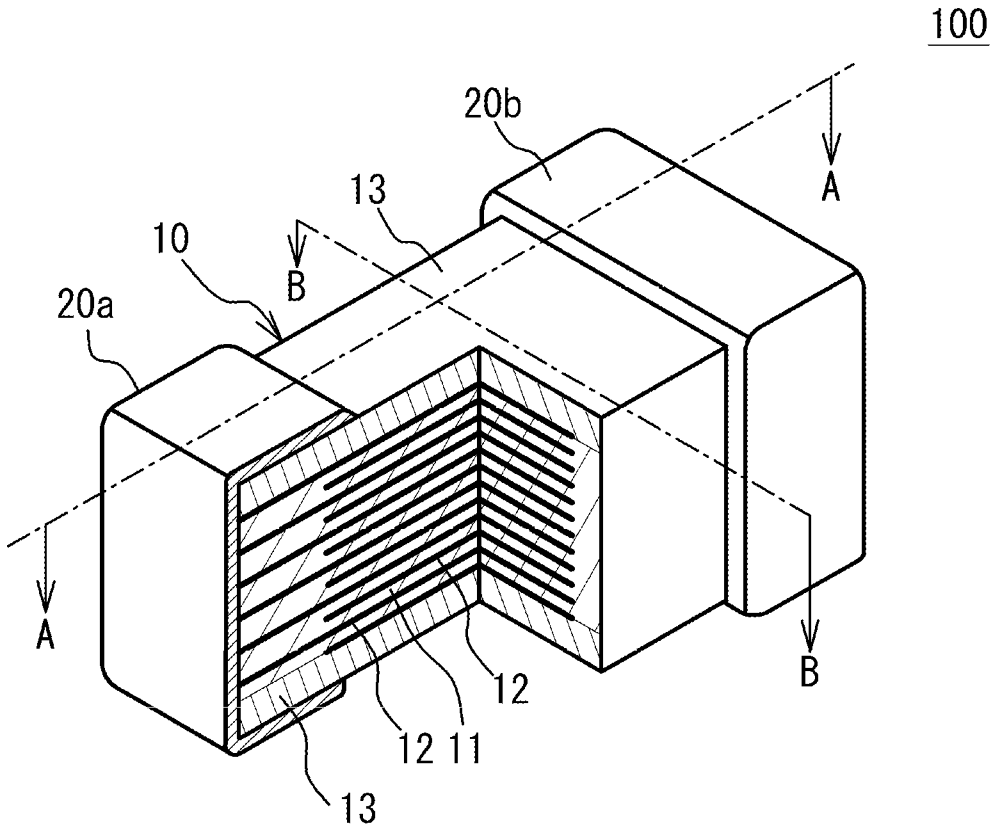
FIG. 1 illustrates a perspective view of a multilayer ceramic capacitor in which a cross section of a part of the multilayer ceramic capacitor is illustrated.
Figure 2:
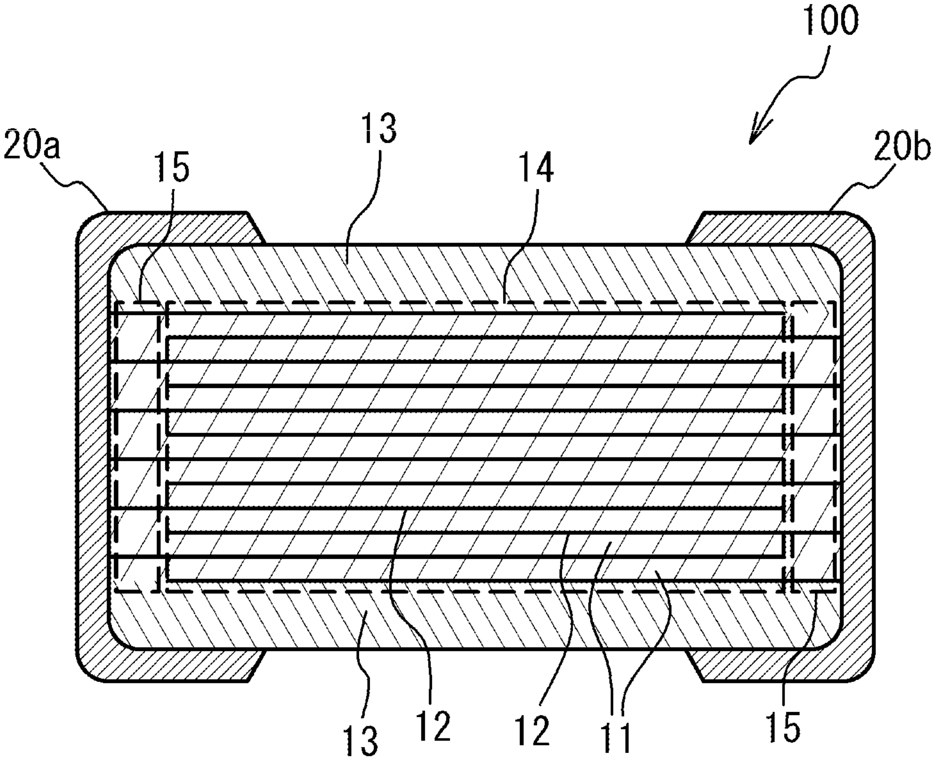
FIG. 2 illustrates a cross sectional view taken along a line A-A of FIG. 1.
Figure 3:
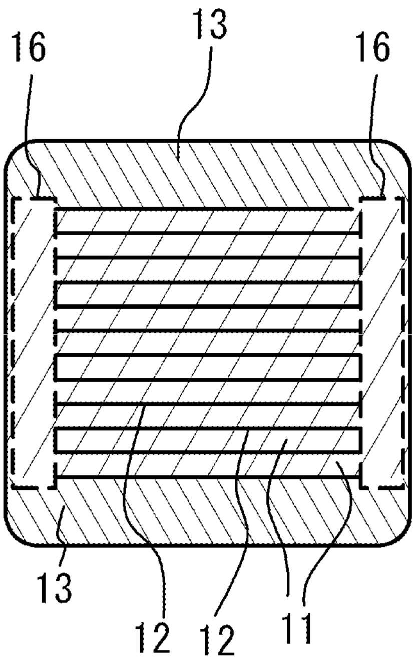
FIG. 3 illustrates a cross sectional view taken along a line B-B of FIG. 1.

(First Embodiment) FIG. 1 illustrates a perspective view of a multilayer ceramic capacitor 100 in accordance with an embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20*a* and 20*b* that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20*a* and 20*b* extend to the upper face, the lower face and the two side faces of the multilayer chip 10. However, the external electrodes 20*a* and 20*b* are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face is opposite to the second end face. The external electrode 20*a* is provided on the first end face. The external electrode 20*b* is provided on the second end face. Thus, the internal electrode layers 12 are alternately conducted to the external electrode 20*a* and the external electrode 20*b*. Thus, the multilayer ceramic capacitor 100 has a structure in which a plurality of the dielectric layers 11 are stacked and each two of the dielectric layers 11 sandwich the internal electrode layer 12. In a multilayer structure of the dielectric layers 11 and the internal electrode layers 12, two of the internal electrode layers 12 are positioned at outermost layers in a stacking direction. The upper face and the lower face of the multilayer structure that are the internal electrode layers 12 are covered by cover layers 13. A main component of the cover layer 13 is a ceramic material. For example, a main component of the cover layer 13 may be the same as that of the dielectric layer 11 or may be different from that of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 0.6 mm, a width of 0.3 mm, and a height of 0.110 mm. The multilayer ceramic capacitor 100 may have a length of 1.0 mm, a width of 0.5 mm, and a height of 0.5 mm. The multilayer ceramic capacitor 100 may have a length of 1.0 mm, a width of 0.5 mm, and a height of 0.1 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

A main component of the dielectric layer 11 is a ceramic material having a perovskite structure expressed by a general formula $ABO_3$. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $MgTiO_3$ (magnesium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. $Ba_{1-x-y}Ca_xSr_yTi_{1-z}Zr_zO_3$ may be barium strontium titanate, barium calcium titanate, barium zirconate, barium titanate zirconate, calcium titanate zirconate, barium calcium titanate zirconate or the like.

Additives may be added to the dielectric layer 11. Additives to the dielectric layer 11 may be molybdenum (Mo), niobium (Nb), tantalum (Ta), tungsten (W), magnesium (Mg), manganese (Mn), vanadium (V), chromium (Cr), rare earth elements (yttrium (Y), samarium (Sm), europium (Eu), gadolinium (Gd), terbium (Tb), dysprosium (Dy), holmium (Ho), erbium (Er), thulium (Tm) and ytterbium (Yb)) or an oxide of cobalt (Co), nickel (Ni), lithium (Li), boron (B), sodium (Na), potassium (K) or silicon (Si), or a glass including cobalt, nickel, lithium, boron, sodium, potassium or silicon.

The internal electrode layer 12 is mainly composed of Ni. The internal electrode layer 12 contains, in addition to Ni, which is the main component, an additive metal element at a molar ratio smaller than that of the main component. The additive metal element is not particularly limited as long as it is other than Ni. For example, the additive metal element may be one or more selected from gold (Au), tin (Sn), Cr, iron (Fe), yttrium (Y), indium (In), arsenic (As), Co, copper (Cu), iridium (Ir), Mg, osmium (Os), palladium (Pd), platinum (Pt), rhenium (Re), rhodium (Rh), ruthenium (Ru), selenium (Se), tellurium (Te), zinc (Zn), and germanium (Ge). When two or more additional metal elements are used, the total molar ratio of the additive metal elements is smaller than the molar ratio of Ni. In addition, the internal electrode layers 12 contain a co-material of ceramic grains. The co-material is not particularly limited, but the same material as the main component ceramic of the dielectric layer 11 can be used. For example, co-materials include $BaTiO_3$ (barium titanate), $CaZrO_3$ (calcium zirconate), $CaTiO_3$ (calcium titanate), $SrTiO_3$ (strontium titanate), $MgTiO_3$ (magnesium titanate), $Ba_{1-x-y}Ca_xSr_yTi_{1-z}Zr_zO_3$ ($0 \leq x \leq 1$, $0 \leq y \leq 1$, $0 \leq z \leq 1$) can be selected and used. $Ba_{1-x-y}Ca_xSr_yTi_{1-z}Zr_zO_3$ can be barium strontium titanate, barium calcium titanate, barium zirconate, barium zirconate titanate, calcium zirconate titanate and barium calcium titanate zirconate.

The external electrodes 20*a* and 20*b* are mainly composed of Ni. The external electrodes 20*a* and 20*b* may contain the same additive metal element as the internal electrode layers 12 in a smaller molar ratio than the main component, in addition to Ni, which is the main component. Also, the external electrodes 20*a* and 20*b* may contain a co-material of ceramic grains. Also, one or more plated layers may be formed on the surfaces of the external electrodes 20*a* and 20*b* opposite to the multilayer chip 10.

As illustrated in FIG. 2, a section, in which a set of the internal electrode layers 12 connected to the external electrode 20*a* face another set of the internal electrode layers 12 connected to the external electrode 20*b*, is a section generating electrical capacity in the multilayer ceramic capacitor 100. Accordingly, the section is referred to as a capacity section 14. That is, the capacity section 14 is a section in which the internal electrode layers next to each other being connected to different external electrodes face each other.

A section, in which the internal electrode layers 12 connected to the external electrode 20*a* face each other without sandwiching the internal electrode layer 12 connected to the external electrode 20*b*, is referred to as an end margin 15. A section, in which the internal electrode layers 12 connected to the external electrode 20*b* face each other without sandwiching the internal electrode layer 12 connected to the external electrode 20*a* is another end margin 15. That is, the end margin 15 is a section in which a set of the internal electrode layers 12 connected to one external electrode face each other without sandwiching the internal electrode layer 12 connected to the other external electrode. The end margins 15 are sections that do not generate electrical capacity in the multilayer ceramic capacitor 100.

As illustrated in FIG. 3, a section of the multilayer chip 10 from the two sides thereof to the internal electrode layers 12 is referred to as a side margin 16. That is, the side margin 16 is a section covering edges of the stacked internal electrode layers 12 in the extension direction toward the two side faces. The side margin 16 does not generate electrical capacity.

The thickness of each internal electrode layer 12 is, for example, 0.2 μm or more and 0.8 μm or less, 0.3 μm or more and 0.8 μm or less, 0.6 μm or more and 0.8 μm or less, 0.8 μm or more and 1.5 μm or less or 1.5 μm or more and 4.0 μm or less. The thickness of the internal electrode layer 12 per layer is obtained by exposing, for example, the section of the multilayer ceramic capacitor 100 illustrated in FIG. 2 and calculating an average value of thicknesses of 10 different points from an image taken by using a scanning transmission electron microscope.

The thickness of the dielectric layer 11 per layer is, for example, 0.2 μm or more and 0.4 μm or less, or 0.4 μm or more and 0.5 μm or less, or 0.4 μm or more and 1.0 μm or less, or 1.0 μm or more and 10 μm or less. The thickness of the dielectric layer 11 per layer is obtained by exposing, for example, the section of the multilayer ceramic capacitor illustrated in FIG. 2 and calculating an average value of thicknesses of 10 different points from an image taken by using a scanning transmission electron microscope.

In order to reduce the size and increase the capacity of the multilayer ceramic capacitor 100, it is conceivable to increase the capacity per unit volume by thinning the dielectric layers 11 and the internal electrode layers 12. However, since the sintering temperature of the dielectric layers 11 is higher than the sintering temperature of the internal electrode layers 12, when the internal electrode layers 12 are made thinner, the continuity modulus of the internal electrode layer 12 may decrease during firing in a temperature range in which the dielectric layer 11 is densified. In particular, the continuity modulus of the internal electrode layers 12 may decrease near the external electrodes 20*a* and 20*b*. For example, the continuity modulus of the internal electrode layers 12 may decrease in the end margins 15. When the continuity modulus of the internal electrode layers 12 is lowered, the bonding between the internal electrode layers 12 and the external electrodes 20*a* and 20*b* is deteriorated, resulting in poor electrical conductivity, and there is a possibility that desired characteristics cannot be obtained.

Figure 4:
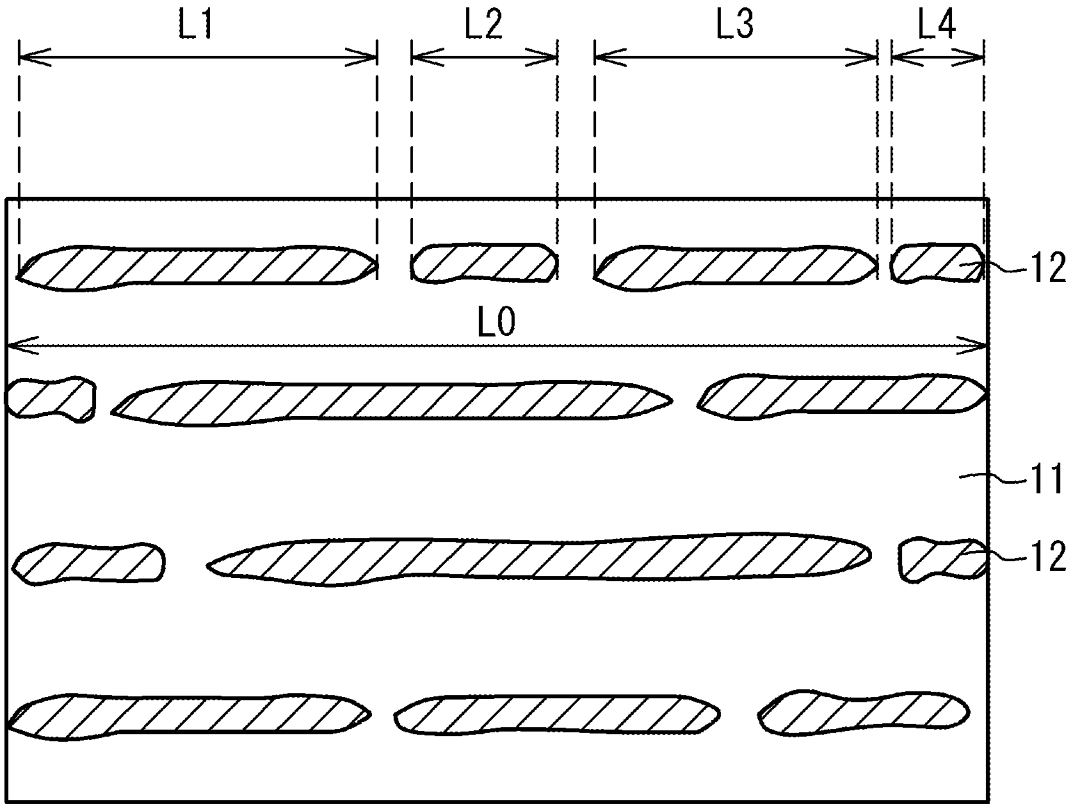
FIG. 4 illustrates a continuity modulus.

FIG. 4 is a diagram illustrating the continuity modulus of the internal electrode layers 12. As exemplified in FIG. 4, in an observation region of length L0 in the internal electrode layer 12, the lengths L1, L2, . . . , Ln are summed and $\Sigma$ Ln/L0 can be defined as the continuity modulus of the layer.

The multilayer ceramic capacitor 100 according to this embodiment has a configuration that improves the bondability between the internal electrode layers 12 and the external electrodes 20*a* and 20*b*.

First, the sintering of the internal electrode layers 12 is delayed because the internal electrode layers 12 contain the co-material. In addition to the main component Ni, the internal electrode layers 12 contain the additive metal element, so that the amount of the co-material remaining in the internal electrode layers 12 can be increased. It is considered that this is because the additive metal element segregates around the co-material grains. By using a fine and highly dispersed co-material, the amount of co-material remaining in the internal electrode layers 12 can be particularly increased. Since the co-material added for the purpose of delaying sintering does not diffuse into the dielectric layer 11 during the sintering process and remains largely in the internal electrode layers 12, a sufficient sintering delay effect can be obtained and the continuity modulus of the internal electrode layer 12 is improved. Furthermore, in the multilayer ceramic capacitor 100 according to this embodiment, the concentration of the additive metal element is higher in the internal electrode layers 12 than in the external electrodes 20*a* and 20*b*. With this configuration, the additive metal element diffuses from the internal electrode layer 12 toward the external electrodes 20*a* and 20*b*, causing a flow of the additive metal element, thereby improving the bondability between the internal electrode layer 12 and the external electrodes 20*a* and 20*b*. As a result, it is possible to suppress a decrease in capacity due to poor connection and achieve desired capacity and characteristics.

Since it is preferable that there is a difference in the concentration of the additive metal element near the external electrode, it is preferable that, in each of the end margins 15, the concentration of the additive metal element in the internal electrode layer 12 connected to the external electrode is higher than that of the external electrode.

When Au, Sn, Cr, Fe, Y, In, As, Co, Cu, Jr, Mg, Os, Pd, Pt, Re, Rh, Ru, Se, Te, Zn, and Ge are used as the additive metal elements, these additive metal elements tend to segregate around the co-material grains, and the amount of the co-material remaining in the internal electrode layers 12 can be increased.

If the amount of the additive metal element in the internal electrode layers 12 is small, there is a risk that a sufficient amount of the co-material cannot remain in the internal electrode layers 12. Therefore, in the internal electrode layer 12, it is preferable to set a lower limit to the additive metal element concentration. For example, in the internal electrode layer 12, the additive metal element concentration is preferably 0.01 at % or more, more preferably 0.1 at % or more, and 1.0 at % or more with respect to Ni. The additive metal element concentration is the atom number ratio of the additive metal element when Ni is assumed to be 100 at %.

On the other hand, if the amount of the additive metal element in the internal electrode layer 12 is large, the additive metal element diffuses into the dielectric layer 11, degrading the additive design of the dielectric layer 11 and causing the capacity and characteristic values to deviate from the design values. Therefore, in the internal electrode layer 12, it is preferable to set an upper limit to the additive metal element concentration. For example, in the internal electrode layer 12, the additive metal element concentration is preferably 5.0 at % or less, more preferably 3.0 at % or less, and 1.5 at % or less with respect to Ni.

From the viewpoint of setting an upper limit and a lower limit for the additive metal element concentration in the internal electrode layer 12, the ratio of the additive metal element concentration in the external electrode to which the internal electrode layer is connected to the additive metal element concentration in the internal electrode layer 12 has an upper limit and a lower limit. For example, the ratio is preferably 0.3 or more and 0.5 or less, more preferably 0.2 or more and 0.4 or less, and 0.1 or more and 0.2 or less.

If the amount of the co-material remaining in the internal electrode layers 12 is small, there is a risk that the sintering retardation effect cannot be sufficiently obtained. Therefore, it is preferable to set a lower limit to the amount of the co-material in the internal electrode layers 12. For example, in the internal electrode layers 12, the amount of the co-material is preferably 5.0 wt % or more, more preferably 10 wt % or more, and even more preferably 15 wt % or more. The amount of the co-material is the weight ratio of the co-material when Ni is assumed to be 100 wt %.

On the other hand, if the amount of the co-material remaining in the internal electrode layers 12 is large, the continuity modulus of the internal electrode layers 12 may decrease and the electric properties may deteriorate due to diffusion of the co-material into the dielectric layers 11 during the sintering process. Therefore, it is preferable to set an upper limit to the amount of the co-material in the internal electrode layers 12. For example, in the internal electrode layers 12, the amount of the co-material is preferably 20 wt % or less, more preferably 15 wt % or less, and even more preferably 10 wt % or less.

Figure 5:
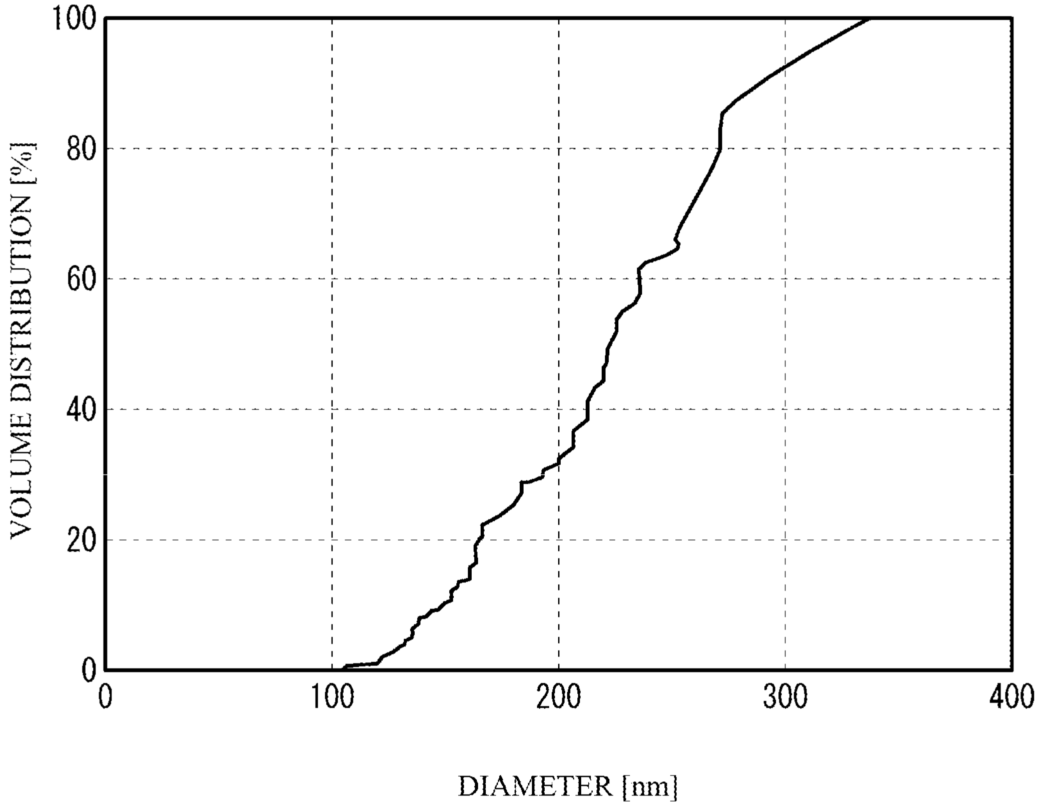
FIG. 5 illustrates a volume distribution of a co-material.

As for the amount of the co-material remaining in the internal electrode layers 12, the volume distribution of the co-material can also be used as an index. For example, as exemplified in FIG. 5, the diameter of each of the plurality of co-materials remaining dispersed in the internal electrode layer 12 is calculated and the volume distribution is calculated so that the sum of the volumes of the co-materials calculated from the diameters are 100%. The horizontal axis indicates the diameter of each co-material. The vertical axis indicates volume distribution (%). In this distribution graph, the smaller the slope m of the straight line obtained by straight line approximation is, the more large-diameter co-materials remain. For example, the slope "m" is preferably 3.8 or more and 5.0 or less, more preferably 3.9 or more and 4.9 or less, and even more preferably 4.5 or more and 4.8 or less. The diameter of each co-material can be obtained, for example, by measuring the maximum length of each grain in an SEM (Scanning Electron Microscope) photograph of the central cross section. The volume of the grain can be calculated as the volume of the cube when the measured diameter is one side of the cube. For linear approximation, a straight line can be obtained by connecting two points of the data using the 20% value and the 80% value of the volume distribution.

Figure 6:
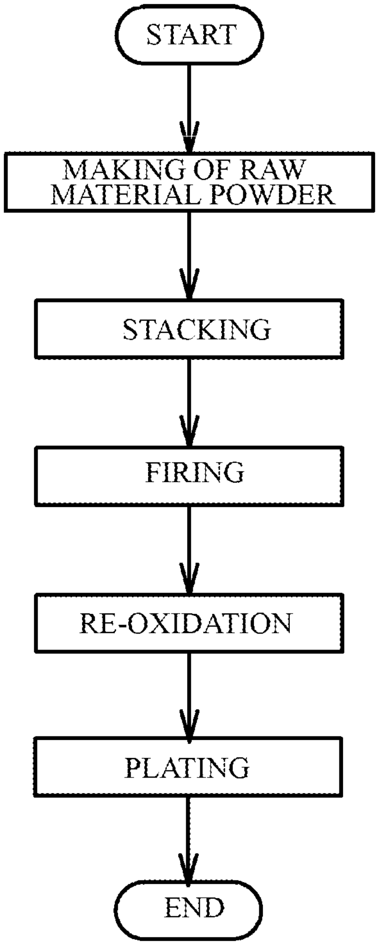
FIG. 6 illustrates a manufacturing method of a multilayer ceramic capacitor.

Next, a description will be given of a manufacturing method of the multilayer ceramic capacitors 100. FIG. 6 illustrates a manufacturing method of the multilayer ceramic capacitor 100.

(Making process of raw material powder) A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiments may use any of these methods.

An additive compound may be added to the resulting ceramic powder, in accordance with purposes. The additive compound may be an oxide of molybdenum (Mo), niobium (Nb), tantalum (Ta), tungsten (W), magnesium (Mg), manganese (Mn), vanadium (V), chromium (Cr), rare earth elements (yttrium (Y), samarium (Sm), europium (Eu), gadolinium (Gd), terbium (Tb), dysprosium (Dy), holmium (Ho), erbium (Er), thulium (Tm) and ytterbium (Yb)) or an oxide of cobalt (Co), nickel (Ni), lithium (Li), boron (B), sodium (Na), potassium (K) or silicon (Si), or a glass including cobalt, nickel, lithium, boron, sodium, potassium or silicon.

For example, the resulting ceramic raw material powder is wet-blended with additives and is dried and crushed. Thus, a ceramic material is obtained. For example, an average particle diameter of the ceramic raw material powder is preferably, 50 nm to 200 nm. For example, the particle diameter may be adjusted by crushing the resulting ceramic material as needed. Alternatively, the particle diameter of the resulting ceramic power may be adjusted by combining the crushing and classifying.

(Stacking process) Next, a binder such as polyvinyl butyral (PVB) resin, an organic solvent such as ethanol or toluene, and a plasticizer are added to the resulting dielectric material and wet-blended. With use of the resulting slurry, a dielectric green sheet 52 having a thickness of 0.8 μm or less is formed on a base material 51 by, for example, a die coater method or a doctor blade method, and then dried. The base material 51 is, for example, PET (polyethylene terephthalate) film.

Figure 7A:
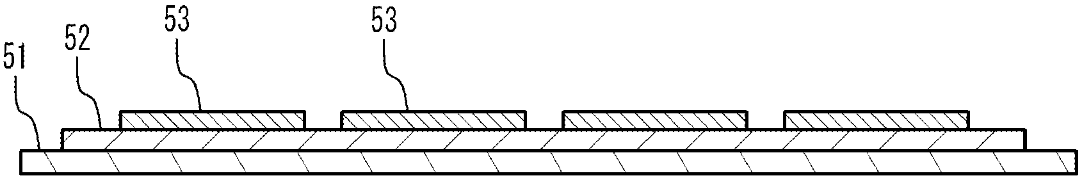
FIG. 7A and FIG. 7B illustrate a staking process.

Next, as illustrated in FIG. 7A, an internal electrode pattern 53 is formed on the dielectric green sheet 52. In FIG. 7A, as an example, four parts of the internal electrode pattern 53 are formed on the dielectric green sheet 52 and are spaced from each other. The dielectric green sheet 52 on which the internal electrode pattern 53 is formed is a stack unit. The internal electrode pattern 53 is a paste material containing Ni powder, which is a main component metal, powder of the co-material, powder of the additive metal element, and the like.

Next, the dielectric green sheets 52 are peeled from the base materials 51. As illustrated in FIG. 8B, a predetermined number (for example, 100 to 500) of the stack units are stacked.

Figure 7B:
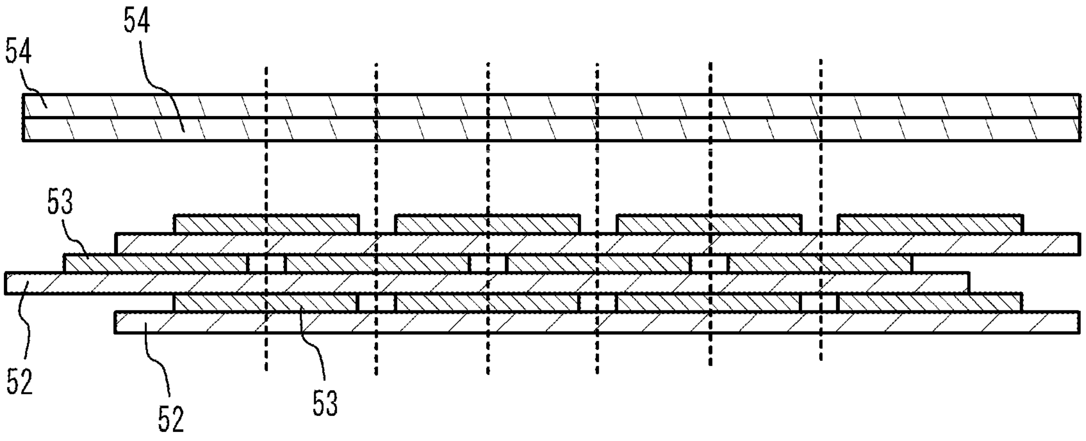

Next, a predetermined number (for example, 2 to 10) of a cover sheet 54 is stacked on an upper face and a lower face of a ceramic multilayer structure of the stacked stack units and is thermally crimped. The resulting ceramic multilayer structure is cut into a chip having a predetermined size (for example, 1.0 mm×0.5 mm). In FIG. 7B, the multilayer structure is cut along a dotted line. The cover sheet 54 may have the same components of the dielectric green sheet 52. The additive compound of the cover sheet 54 may be different from that of the dielectric green sheet 52. A metal paste to be the external electrode is applied to both end faces of the resulting ceramic multilayer structure by a dipping or the like. The metal paste contains Ni powder, which is the main component metal, and may contain the co-material powder, the additive metal element powder, and the like. When the metal paste contains the additive metal element, the additive metal element concentration with respect to Ni is made smaller than the additive metal element concentration (concentration with respect to Ni) in the internal electrode pattern.

(Firing process) The binder is removed from the ceramic multilayer structure in $N_2$ atmosphere in a temperature range of 250 degrees C. to 500 degrees C. After that, the resulting ceramic multilayer structure is fired for 10 minutes to 2 hours in a reductive atmosphere having an oxygen partial pressure of $10^{-5}$ to $10^{-8}$ atm in a temperature range of 1100 degrees C. to 1300 degrees C. Thus, the multilayer ceramic capacitor 100 is obtained. By increasing the rate of temperature rise in the firing step, the metal material is sintered before the co-material is extruded from the metal material, so the co-material tends to remain in the internal electrode layers 12. Therefore, the average rate of temperature rise from room temperature to the maximum temperature in the firing step is preferably 30° C./min or more, more preferably 45° C./min or more. If the average rate of temperature rise is too high, the organic components remaining in the ceramic multilayer structure (those that could not be removed only by the binder removal treatment) cannot be sufficiently discharged, resulting in problems such as cracks occurring during the firing process. Therefore, the average rate of temperature rise is preferably 80° C./min or less, more preferably 65° C./min or less.

(Re-oxidizing process) After that, a re-oxidation process may be performed in a $N_2$ gas atmosphere at approximately at 600 degrees C. to 1000 degrees C. so that the internal electrode layer 12 is not oxidized.

(Plating process) After that, by a plating process, metal coating of Cu, Ni, Sn or the like may be performed on the surface of the external electrodes 20*a* and 20*b*.

According to the manufacturing method according to the present embodiment, since the internal electrode pattern 53 contains the co-material, the sintering of the metal component contained in the internal electrode pattern 53 is delayed. In addition to the main component Ni, the internal electrode pattern 53 contains the additive metal element, so that the amount of co-material remaining in the internal electrode layer 12 after firing can be increased. Since the co-material added for the purpose of delaying sintering does not diffuse into the dielectric layer 11 during the sintering process and remains largely in the internal electrode layers 12, a sufficient sintering delay effect can be obtained. Thus, the continuity modulus of the internal electrode layer 12 is improved. In addition, since the additive metal element concentration with respect to Ni is higher in the internal electrode pattern 53 than in the metal paste for forming the external electrodes, the additive metal element diffuses from the internal electrode layer 12 toward the external electrodes 20*a* and 20*b*. Since the additive metal element diffuses and flows, the bondability between the internal electrode layer 12 and the external electrodes 20*a* and 20*b* is improved. As a result, it is possible to suppress a decrease in capacity due to poor connection and achieve desired capacity and characteristics.

(Second Embodiment) A description will be given of a second embodiment. Points of the second embodiment different from the first embodiment will be described.

The external electrodes 20*a* and 20*b* are mainly composed of Ni. The external electrodes 20*a* and 20*b* contain, in addition to Ni, which is the main component, an additive metal element at a molar ratio smaller than that of the main component. The additive metal element is not particularly limited as long as it is other than Ni. For example, the additive metal element may be one or more selected from gold (Au), tin (Sn), chromium Cr, iron (Fe), yttrium (Y), indium (In), arsenic (As), Co (cobalt), copper (Cu), iridium (Jr), Mg (magnesium), osmium (Os), palladium (Pd), platinum (Pt), rhenium (Re), rhodium (Rh), ruthenium (Ru), selenium (Se), tellurium (Te), zinc (Zn), and germanium (Ge). When two or more additional metal elements are used, the total molar ratio of the additive metal elements is smaller than the molar ratio of Ni. In addition, the external electrodes 20*a* and 20*b* contain a co-material of ceramic grains. The co-material is not particularly limited, but the same material as the main component ceramic of the dielectric layer 11 can be used. For example, co-materials include $BaTiO_3$ (barium titanate), $CaZrO_3$ (calcium zirconate), $CaTiO_3$ (calcium titanate), $SrTiO_3$ (strontium titanate), $MgTiO_3$ (magnesium titanate), $Ba_{1-x-y}Ca_xSr_yTi_{1-z}Zr_zO_3$ ($0 \le x \le 1$, $0 \le y \le 1$, $0 \le z \le 1$) can be selected and used. $Ba_{1-x-y}Ca_xSr_yTi_{1-z}Zr_zO_3$ can be barium strontium titanate, barium calcium titanate, barium zirconate, barium zirconate titanate, calcium zirconate titanate and barium calcium titanate zirconate.

The internal electrode layer 12 is mainly composed of Ni. The internal electrode layer 12 may contain the same additive metal element as the external electrodes 20*a* and 20*b* in a smaller molar ratio than the main component, in addition to Ni, which is the main component. Also, the internal electrode layer 12 may contain a co-material of ceramic grains.

When the external electrodes 20*a* and 20*b* and the dielectric layer 11 are fired at the same time, the dielectric layer 11 and the external electrodes 20*a* and 20*b* have different densification temperature ranges during the firing process. Therefore, there is a risk of oversintering and shrinkage of the external electrodes 20*a* and 20*b*. In this case, the bondability between the internal electrode layers 12 and the external electrodes 20*a* and 20*b* is deteriorated, resulting in poor electrical conductivity and the desired characteristics may not be obtained.

Figure 8:
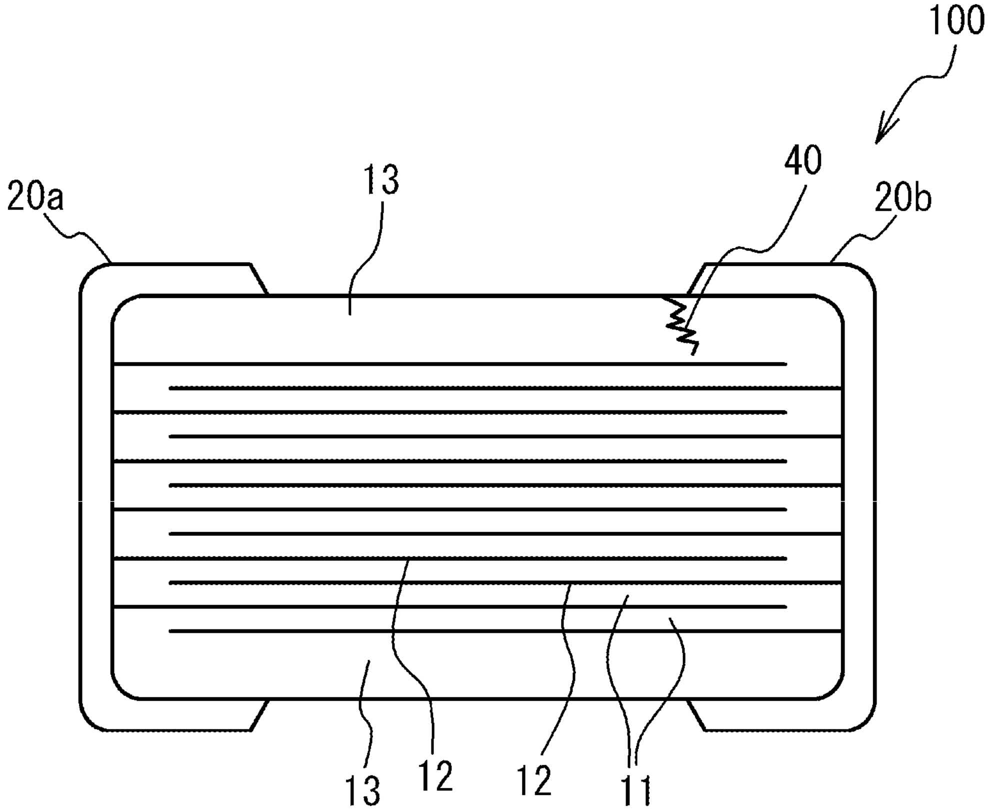
FIG. 8 illustrates a crack.

Further, when the external electrodes 20*a* and 20*b* shrink during the firing process, the ends of the external electrodes 20*a* and 20*b* become embedded in the multilayer chip 10, generating stress. As illustrated in FIG. 8, cracks 40 may occur in the multilayer chip 10.

The multilayer ceramic capacitor 100 according to this embodiment has a configuration that improves the bondability between the internal electrode layers 12 and the external electrodes 20*a* and 20*b*. Moreover, the multilayer ceramic capacitor 100 according to the present embodiment has a structure capable of suppressing the occurrence of cracks.

First, sintering of the external electrodes 20*a* and 20*b* is delayed because the external electrodes 20*a* and 20*b* contain the co-material. In addition, the external electrodes 20*a* and 20*b* contain the additive metal element in addition to Ni, which is the main component, so that the amount of co-material remaining in the external electrodes 20*a* and 20*b* can be increased. It is considered that this is because the additive metal element segregates around the co-material grains. By using a fine and highly dispersed co-material, the amount of the co-material remaining in the external electrodes 20*a* and 20*b* can be particularly increased. The co-material added for the purpose of delaying sintering does not diffuse into the dielectric layer 11 during the sintering process and remains largely in the external electrodes 20*a* and 20*b*. Therefore, the effect of delaying the sintering can be sufficiently achieved. Thus, the occurrence of the cracks can be suppressed. Furthermore, in the multilayer ceramic capacitor 100 according to this embodiment, the concentration of the additive metal element is higher in the external electrodes 20*a* and 20*b* than in the internal electrode layers 12. With this configuration, the additive metal element diffuses from the external electrodes 20*a* and 20*b* toward the internal electrode layer 12, and the additive metal element flows, thereby improving the bondability between the internal electrode layer 12 and the external electrodes 20*a* and 20*b*. As a result, it is possible to suppress a decrease in capacity due to poor connection and achieve desired capacity and characteristics. By diffusing the additive metal element into the internal electrode layer 12 containing the co-material, a sintering delay effect can be obtained also in the internal electrode layer 12, so that the bondability between the internal electrode layer 12 and the external electrodes 20*a* and 20*b* is improved.

Since it is preferable that there is a difference in the concentration of the additive metal element near the external electrode, the concentration of the additive metal element in each of the end margins 15 is higher than that of the internal electrode layer 12, which is connected to the internal electrode layer.

When Au, Sn, Cr, Fe, Y, In, As, Co, Cu, Ir, Mg, Os, Pd, Pt, Re, Rh, Ru, Se, Te, Zn, and Ge are used as additive metal elements, these additive metal elements tend to segregate around the material grains, and the amount of co-material remaining in the external electrodes 20*a* and 20*b* can be increased.

If the amount of the additive metal element in the external electrodes 20*a* and 20*b* is small, there is a possibility that a sufficient amount of the co-material cannot remain in the external electrodes 20*a* and 20*b*. Therefore, in the external electrodes 20*a* and 20*b*, it is preferable to set a lower limit to the additive metal element concentration. For example, in the external electrodes 20*a* and 20*b*, the additive metal element concentration is preferably 0.01 at % or more, more preferably 0.1 at % or more, and 1.0 at % or more with respect to Ni. The additive metal element concentration is the atom number ratio of the additive metal element when Ni is assumed to be 100 at %.

On the other hand, if the amount of the additive metal element in the external electrodes 20*a* and 20*b* is large, the additive metal element diffuses into the dielectric layer 11, degrading the additive design of the dielectric layer 11 and causing the capacity and characteristic values to deviate from the design values. Therefore, it is preferable to set an upper limit to the additive metal element concentration in the external electrodes 20*a* and 20*b*. For example, in the external electrodes 20*a* and 20*b*, the additive metal element concentration is preferably 5.0 at % or less, more preferably 3.0 at % or less, and 1.5 at % or less with respect to Ni.

From the viewpoint of setting upper and lower limits for the additive metal element concentration in the external electrodes 20*a* and 20*b*, it is preferable that the ratio of the additive metal element concentration in the internal electrode layer 12 to which the external electrodes are connected to the additive metal element concentration in the external electrodes 20*a* and 20*b* has an upper limit and a lower limit. For example, the ratio is preferably 0.3 or more and 0.5 or less, more preferably 0.2 or more and 0.4 or less, and 0.1 or more and 0.2 or less.

If the amount of the co-material remaining in the external electrodes 20*a* and 20*b* is small, there is a risk that a sufficient sintering delay effect cannot be obtained. Therefore, in the external electrodes 20*a* and 20*b*, it is preferable to set a lower limit to the amount of the co-material. For example, in the external electrodes 20*a* and 20*b*, the amount of the co-material is preferably 10 wt % or more, more preferably 15 wt % or more, and even more preferably 25 wt % or more. The amount of the co-material is the weight ratio of the co-material when Ni is assumed to be 100 wt %.

On the other hand, if the amount of the co-material remaining in the external electrodes 20*a* and 20*b* is large, the number of locations where the contraction is delayed locally increases, and contraction stress accumulates from these locations, which may induce cracks from inside the external electrode. Therefore, it is preferable to set an upper limit on the amount of the co-material in the external electrodes 20*a* and 20*b*. For example, in the external electrodes 20*a* and 20*b*, the amount of the co-material is preferably 40 wt % or less, more preferably 35 wt % or less, and even more preferably 30 wt % or less.

Figure 9:
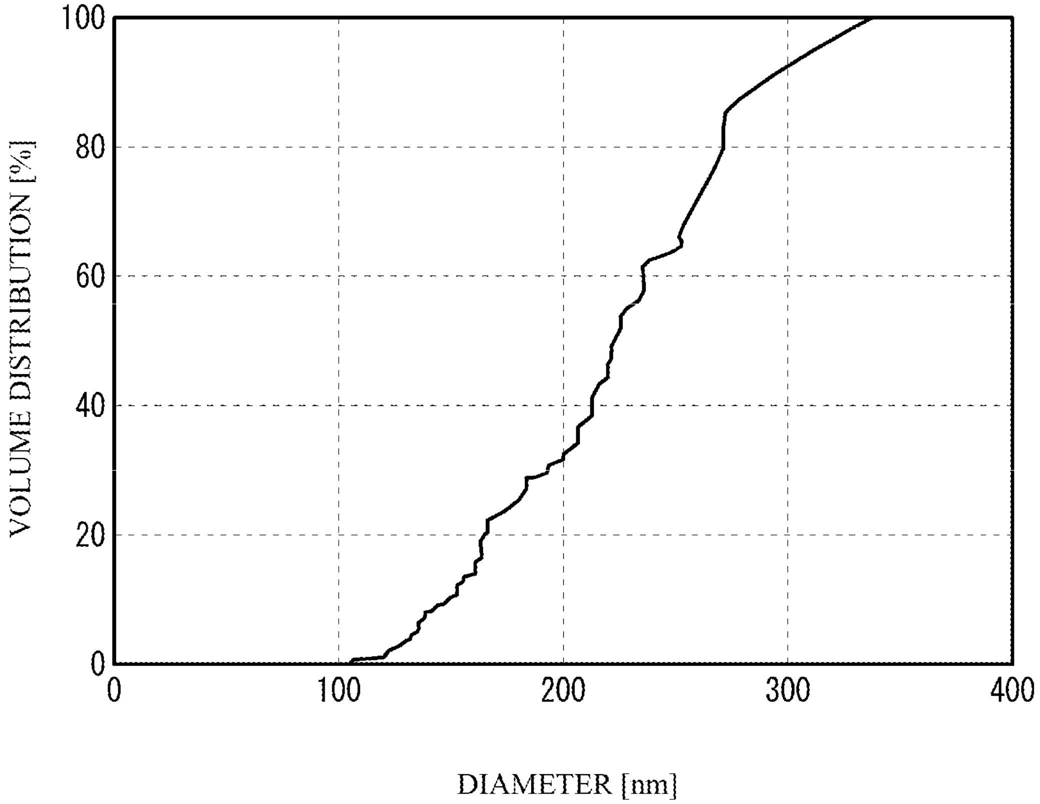
FIG. 9 illustrates a volume distribution of a co-material.

As for the amount of the co-material remaining in the external electrodes 20*a* and 20*b*, the volume distribution of the co-material can also be used as an index. For example, as exemplified in FIG. 9, the diameter of each of the plurality of co-materials remaining dispersed in the internal electrode layer 12 is calculated and the volume distribution is calculated so that the sum of the volumes of the co-materials calculated from the diameters are 100%. The horizontal axis indicates the diameter of each co-material. The vertical axis indicates volume distribution (%). In this distribution graph, the smaller the slope "m" of the straight line obtained by straight line approximation is, the more large-diameter co-materials remain. For example, the slope "m" is preferably 3.8 or more and 5.0 or less, more preferably 3.9 or more and 4.9 or less, and even more preferably 4.5 or more and 4.8 or less. The diameter of each co-material can be obtained, for example, by measuring the maximum length of each grain in an SEM (Scanning Electron Microscope) photograph of the central cross section. The volume of the grain can be calculated as the volume of the cube when the measured diameter is one side of the cube. For linear approximation, a straight line can be obtained by connecting two points of the data using the 20% value and the 80% value of the volume distribution.

Figure 10:
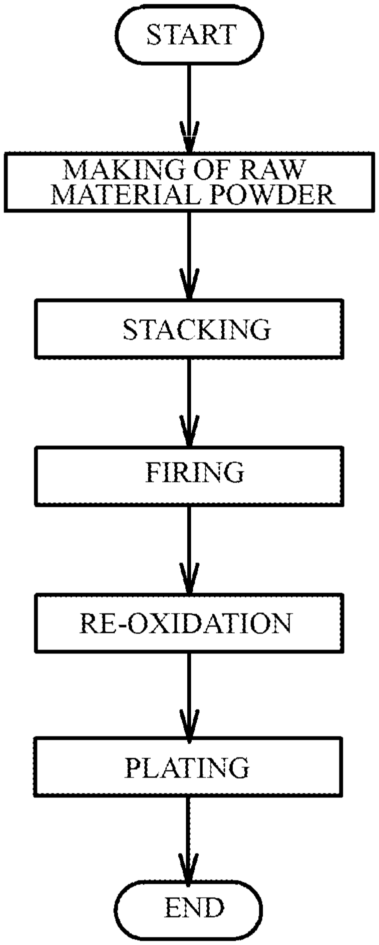
FIG. 10 illustrates a manufacturing method of a multilayer ceramic capacitor.

Next, a description will be given of a manufacturing method of the multilayer ceramic capacitors 100. FIG. 10 illustrates a manufacturing method of the multilayer ceramic capacitor 100.

(Making process of raw material powder) A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiments may use any of these methods.

An additive compound may be added to the resulting ceramic powder, in accordance with purposes. The additive compound may be an oxide of molybdenum (Mo), niobium (Nb), tantalum (Ta), tungsten (W), magnesium (Mg), manganese (Mn), vanadium (V), chromium (Cr), rare earth elements (yttrium (Y), samarium (Sm), europium (Eu), gadolinium (Gd), terbium (Tb), dysprosium (Dy), holmium (Ho), erbium (Er), thulium (Tm) and ytterbium (Yb)) or an oxide of cobalt (Co), nickel (Ni), lithium (Li), boron (B), sodium (Na), potassium (K) or silicon (Si), or a glass including cobalt, nickel, lithium, boron, sodium, potassium or silicon. $SiO_2$ mainly acts as a sintering assistant.

For example, the resulting ceramic raw material powder is wet-blended with additives and is dried and crushed. Thus, a ceramic material is obtained. For example, an average particle diameter of the ceramic raw material powder is preferably, 50 nm to 200 nm. For example, the particle diameter may be adjusted by crushing the resulting ceramic material as needed. Alternatively, the particle diameter of the resulting ceramic power may be adjusted by combining the crushing and classifying.

(Stacking process) Next, a binder such as polyvinyl butyral (PVB) resin, an organic solvent such as ethanol or toluene, and a plasticizer are added to the resulting dielectric material and wet-blended. With use of the resulting slurry, the dielectric green sheet 52 having a thickness of 0.8 μm or less is formed on the base material 51 by, for example, a die coater method or a doctor blade method, and then dried. The base material 51 is, for example, PET (polyethylene terephthalate) film.

Figure 11A:
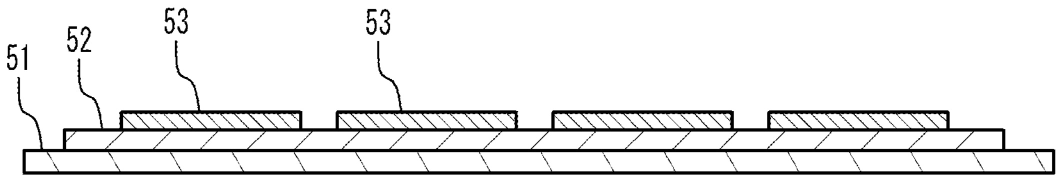
FIG. 11A and FIG. 11B illustrate a staking process.

Next, as illustrated in FIG. 11A, the internal electrode pattern 53 is formed on the dielectric green sheet 52. In FIG. 11A, as an example, four parts of the internal electrode pattern 53 are formed on the dielectric green sheet 52 and are spaced from each other. The dielectric green sheet 52 on which the internal electrode pattern 53 is formed is a stack unit. The internal electrode pattern 53 is a paste material containing Ni powder, which is a main component metal, powder of the co-material, powder of the additive metal element, and the like. When the additive metal element is added to the internal electrode pattern 53, the concentration of the additive metal element with respect to Ni is made smaller than the concentration of the additive metal element (with respect to Ni) in the metal paste for forming the external electrodes.

Figure 11B:
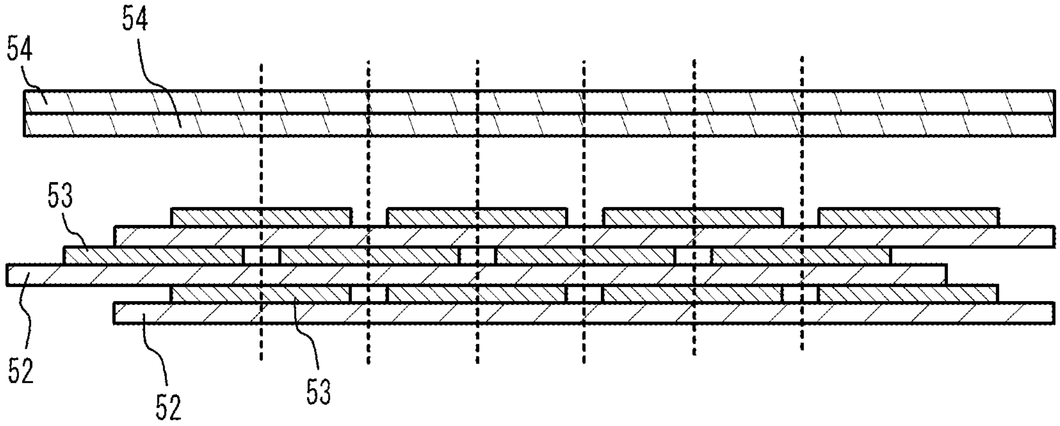

Next, the dielectric green sheets 52 are peeled from the base materials 51. As illustrated in FIG. 11B, a predetermined number (for example, 100 to 500) of the stack units are stacked.

Next, a predetermined number (for example, 2 to 10) of the cover sheet 54 is stacked on an upper face and a lower face of a ceramic multilayer structure of the stacked stack units and is thermally crimped. The resulting ceramic multilayer structure is cut into a chip having a predetermined size (for example, 1.0 mm×0.5 mm). In FIG. 11B, the multilayer structure is cut along a dotted line. The cover sheet 54 may have the same components of the dielectric green sheet 52. The additive compound of the cover sheet 54 may be different from that of the dielectric green sheet 52. A metal paste to be the external electrode is applied to both end faces of the resulting ceramic multilayer structure by a dipping or the like. The metal paste contains Ni powder, which is the main component metal, and may contain the co-material powder, the additive metal element powder, and the like.

(Firing process) The binder is removed from the ceramic multilayer structure in $N_2$ atmosphere in a temperature range of 250 degrees C. to 500 degrees C. After that, the resulting ceramic multilayer structure is fired for 10 minutes to 2 hours in a reductive atmosphere having an oxygen partial pressure of $10^{-5}$ to $10^{-8}$ atm in a temperature range of 1100 degrees C. to 1300 degrees C. Thus, the multilayer ceramic capacitor 100 is obtained. By increasing the rate of temperature rise in the firing step, the metal material is sintered before the co-material is extruded from the metal material, so the co-material tends to remain in the external electrodes 20*a* and 20*b*. Therefore, the average rate of temperature rise from room temperature to the maximum temperature in the firing step is preferably 30° C./min or more, more preferably 45° C./min or more. If the average rate of temperature rise is too high, the organic components remaining in the ceramic multilayer structure (those that could not be removed only by the binder removal treatment) cannot be sufficiently discharged, resulting in problems such as cracks occurring during the firing process. Therefore, the average rate of temperature rise is preferably 80° C./min or less, more preferably 65° C./min or less.

(Re-oxidizing process) After that, a re-oxidation process may be performed in a $N_2$ gas atmosphere at approximately at 600 degrees C. to 1000 degrees C. so that the internal electrode layer 12 is not oxidized.

(Plating process) After that, by a plating process, metal coating of Cu, Ni, Sn or the like may be performed on the surface of the external electrodes 20*a* and 20*b*.

According to the manufacturing method according to the present embodiment, since the metal paste for forming the external electrodes contains the co-material, the sintering of the metal component contained in the metal paste is delayed. In addition to the main component Ni, the metal paste contains the additive metal element, so that the amount of co-material remaining in the external electrodes 20*a* and 20*b* after firing can be increased. Since the co-material added for the purpose of delaying sintering does not diffuse into the dielectric layer 11 during the sintering process and remains largely in the external electrodes, a sufficient sintering delay effect can be obtained. Thus, the occurrence of the cracks is suppressed. In addition, since the additive metal element concentration with respect to Ni is higher in the metal paste than in the internal electrode pattern 53, the additive metal element diffuses from the external electrodes 20*a* and 20*b* toward the internal electrode layer 12. Since the additive metal element diffuses and flows, the bondability between the internal electrode layer 12 and the external electrodes 20*a* and 20*b* is improved. When the co-material contained in the external electrodes 20*a* and 20*b* and the dielectric layer 11 and the cover layer 13 are the same material, the dielectric layer 11 and the cover layer 13 are integrated at the boundaries between the multilayer chip 10 and the external electrodes 20*a* and 20*b* through a sintering process. Therefore, the adhesion of the external electrodes 20_a_ and 20_b_ is improved. As a result, it is possible to prevent a decrease in capacity due to poor connection and the formation of pores and the like at the boundary, so that it is possible to obtain effects such as less penetration of moisture into the boundary, and the desired capacity and characteristics can be achieved. By diffusing the additive metal element into the internal electrode layer 12 containing the co-material, a sintering delay effect can be obtained also in the internal electrode layer 12, so that the bondability between the internal electrode layer 12 and the external electrodes 20_a_ and 20_b_ is improved.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

Hereinafter, the multilayer ceramic capacitor according to the embodiment was manufactured and its characteristics were investigated.

(Example 1) A stack unit was obtained by forming a dielectric green sheet containing barium titanate as a dielectric material and printing an internal electrode pattern containing Ni powder, a co-material, and an additive metal element. 200 numbers of the stack units were stacked, crimped and cut. After removing the binder, a metal paste for external electrodes containing Ni powder and a co-material was applied to the two end faces of the stack units, and fired in a reducing atmosphere. $BaTiO_3$ was used as the co-material for the internal electrode pattern and the metal paste. Au was used as the additive metal element for the internal electrode pattern. The amount of Au added to the internal electrode pattern was set to 1.0 at % when Ni was assumed to be 100 at %.

The thickness of the dielectric layer after firing was 0.6 μm, and the thickness of the internal electrode layer was 0.7 μm. After firing, (concentration of additive metal element in external electrode before forming plated layer)/(concentration of additive metal element in internal electrode layer) at the end margin was 0.52. The end margin is a part of the end margin 15 illustrated in FIG. 2. The additive metal element was detected by EDS (energy dispersive X-ray spectroscopy), and (amount of additive metal element detected in external electrode)/(detected amount of additive metal element in internal electrode layer) was used as the ratio. The EDS analysis in this case is a point analysis, and the detected amount is the detected amount at a predetermined irradiation point. The slope "m" of the graph calculated from the diameter and volume distribution of the co-material was 4.64.

(Example 2) In Example 2, Sn was used as the additive metal element. The amount of Sn added to the internal electrode pattern was set to 1.0 at % when Ni was assumed to be 100 at %. Other conditions were the same as in Example 1.

The thickness of the dielectric layer after firing was 0.6 μm, and the thickness of the internal electrode layer was 0.7 μm. After firing, (concentration of additive metal element in external electrode before forming plated layer)/(concentration of additive metal element in internal electrode layer) at the end margin was 0.28. The slope "m" of the graph calculated from the diameter and volume distribution of the co-material was 3.90.

(Example 3) In Example 3, Cr was used as the additive metal element. The amount of Cr added to the internal electrode pattern was set to 1.0 at % when Ni was assumed to be 100 at %. Other conditions were the same as in Example 1.

The thickness of the dielectric layer after firing was 0.6 μm, and the thickness of the internal electrode layer was 0.7 μm. After firing, (concentration of additive metal element in external electrode before forming plated layer)/(concentration of additive metal element in internal electrode layer) at the end margin was 0.51. The slope "m" of the graph calculated from the diameter and volume distribution of the co-material was 4.56.

(Example 4) In Example 4, Fe was used as the additive metal element. The amount of Fe added to the internal electrode pattern was set to 1.0 at % when Ni was assumed to be 100 at %. Other conditions were the same as in Example 1.

The thickness of the dielectric layer after firing was 0.6 μm, and the thickness of the internal electrode layer was 0.7 μm. After firing, (concentration of additive metal element in external electrode before forming plated layer)/(concentration of additive metal element in internal electrode layer) at the end margin was 0.43. The slope "m" of the graph calculated from the diameter and volume distribution of the co-material was 3.80.

(Example 5) In Example 5, Y was used as the additive metal element. The amount of Y added to the internal electrode pattern was set to 1.0 at % when Ni was assumed to be 100 at %. Other conditions were the same as in Example 1.

The thickness of the dielectric layer after firing was 0.6 μm, and the thickness of the internal electrode layer was 0.7 μm. After firing, (concentration of additive metal element in external electrode before forming plated layer)/(concentration of added metal element in internal electrode layer) at the end margin was 0.44. The slope "m" of the graph calculated from the diameter and volume distribution of the co-material was 3.95.

(Example 6) In Example 6, In was used as the additive metal element. The amount of In added to the internal electrode pattern was set to 1.0 at % when Ni was assumed to be 100 at %. Other conditions were the same as in Example 1.

The thickness of the dielectric layer after firing was 0.6 μm, and the thickness of the internal electrode layer was 0.7 μm. After firing, (concentration of additive metal element in external electrode before forming plated layer)/(concentration of additive metal element in internal electrode layer) at the end margin was 0.43. The slope "m" of the graph calculated from the diameter and volume distribution of the co-material was 3.85.

(Example 7) In Example 7, Au and Sn were used as the additive metal elements. The amounts of Au and Sn added to the internal electrode pattern were set to 0.5 at % and 1.0 at %, respectively, assuming 100 at % of Ni. Other conditions were the same as in Example 1.

The thickness of the dielectric layer after firing was 0.6 μm, and the thickness of the internal electrode layer was 0.7 μm. After firing, (concentration of additive metal element in external electrode before forming plated layer)/(concentration of additive metal element in internal electrode layer) at the end margin was 0.53. The slope "m" of the graph calculated from the diameter and volume distribution of the co-material was 4.77.

(Example 8) In Example 8, Au and Cr were used as the additive metal elements. The amounts of Au and Cr added to the internal electrode pattern were set to 0.5 at % and 1.0 at %, respectively, assuming 100 at % of Ni. Other conditions were the same as in Example 1.

The thickness of the dielectric layer after firing was 0.6 μm, and the thickness of the internal electrode layer was 0.7 μm. After firing, (concentration of additive metal element in external electrode before forming plated layer)/(concentration of additive metal element in internal electrode layer) at the end margin was 0.52. The slope "m" of the graph calculated from the diameter and volume distribution of the co-material was 4.66.

(Example 9) In Example 9, Au, Sn, and Cr were used as additive metal elements. The amounts of Au, Sn, and Cr added to the internal electrode pattern were set to 0.5 at %, 0.5 at %, and 1.0 at %, respectively, assuming 100 at % of Ni. Other conditions were the same as in Example 1.

The thickness of the dielectric layer after firing was 0.6 μm, and the thickness of the internal electrode layer was 0.7 μm. After firing, (concentration of additive metal element in external electrode before forming plated layer)/(concentration of additive metal element in internal electrode layer) at the end margin was 0.54. The slope "m" of the graph calculated from the diameter and volume distribution of the co-material was 4.79.

(Comparative Example 1) In Comparative Example 1, no additive metal element was added to the internal electrode pattern. Other conditions were the same as in Example 1.

The thickness of the dielectric layer after firing was 0.6 μm, and the thickness of the internal electrode layer was 0.7 μm. The slope "m" of the graph calculated from the diameter and volume distribution of the co-material was 6.39.

Figure 12A:
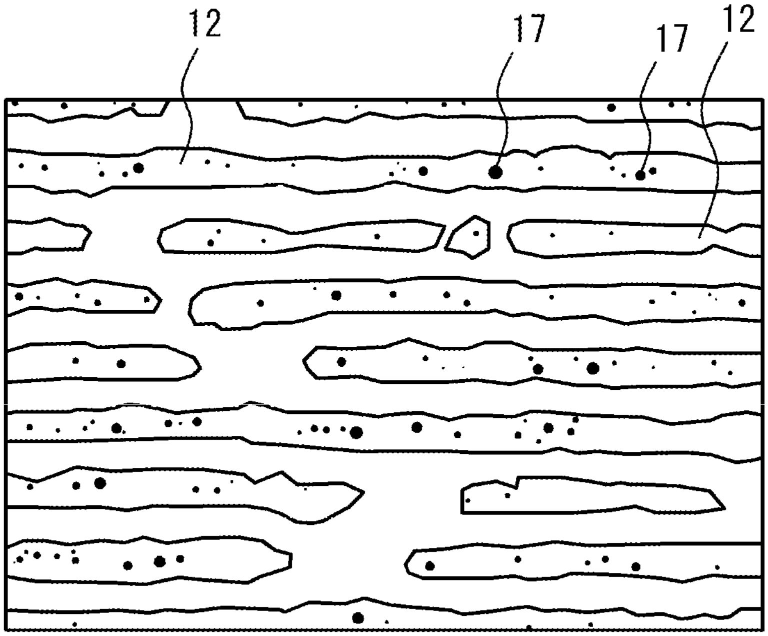
FIG. 12A is a diagram obtained by tracing a SEM photograph of a cross section in a stacking direction of Example 1.
Figure 12B:
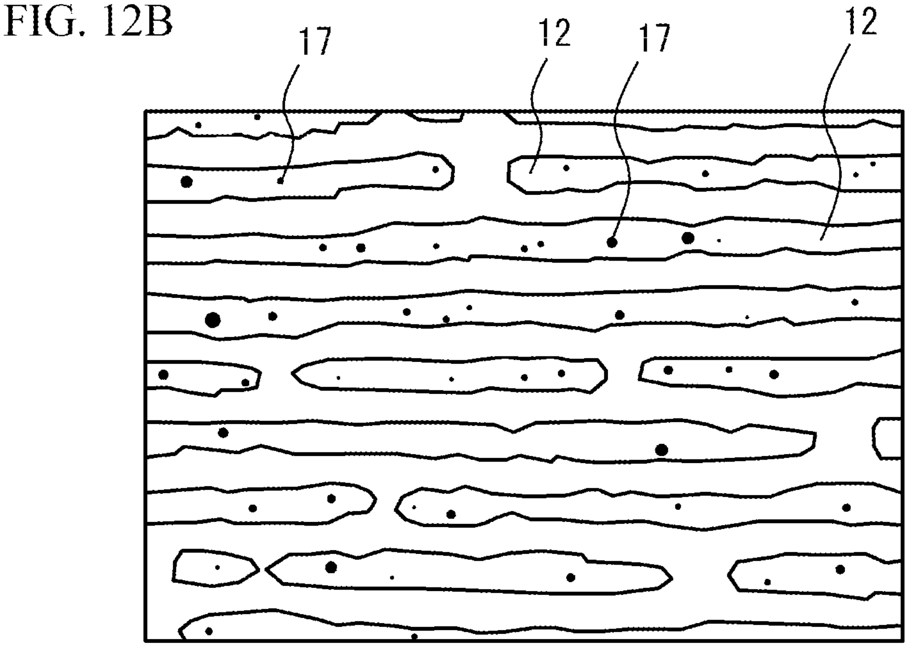
FIG. 12B is a diagram obtained by tracing a SEM photograph of a cross section in a stacking direction of Comparative Example 1.

FIG. 12A is a diagram obtained by tracing the SEM photograph of the cross section in the stacking direction of Example 1. FIG. FIG. 12B is a diagram obtained by tracing the SEM photograph of a cross section in the stacking direction of Comparative Example 1. In comparison with FIG. 12B, it can be seen that a large amount of co-material 17 remains in the internal electrode layer 12 in FIG. 12A.

Figure 13:
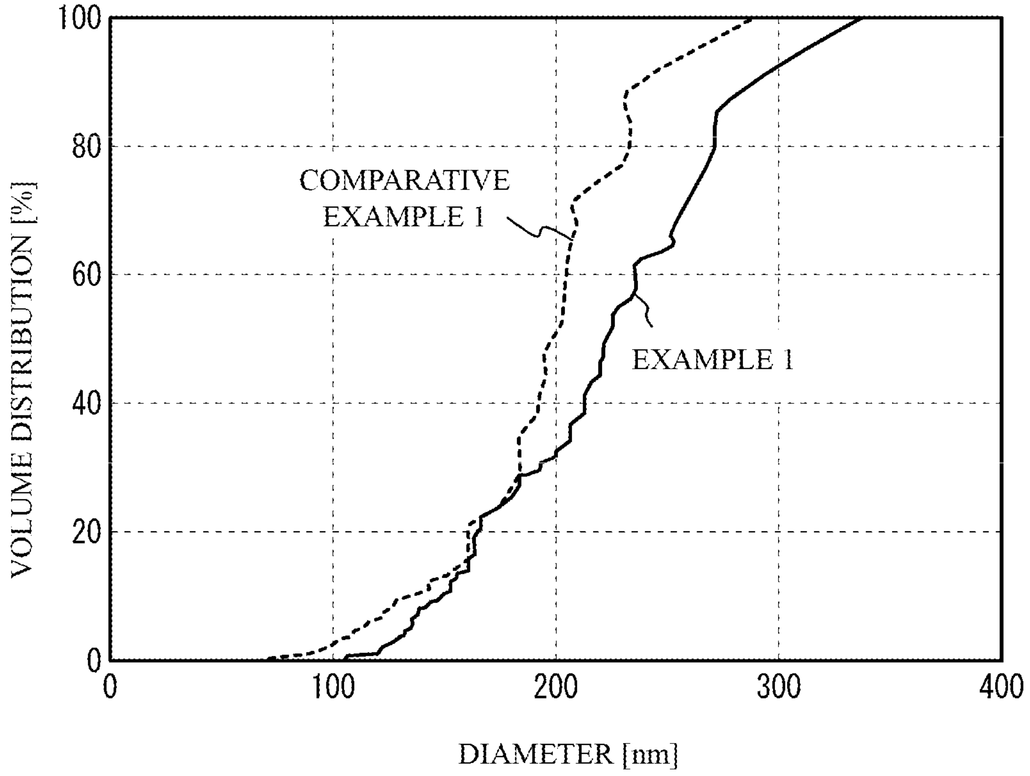
FIG. 13 is a graph calculated from a diameter and volume distribution of a co-material for Example 1 and Comparative Example 1.

FIG. 13 is a graph calculated from the diameter and volume distribution of the co-material in the internal electrode layer for Example 1 and Comparative Example 1. As shown in FIG. 13, it can be seen that the slope "m" is smaller in Example 1 than in Comparative Example 1. Therefore, it can be seen that a larger amount of the co-material remains in Example 1 than in Comparative Example 1. It is considered that this is because the additive metal element was added to the internal electrode pattern. In addition, 500 co-materials were counted in Comparative Example 1, and 500 co-materials were counted in Example 1.

(Continuity modulus) The continuity modulus of the internal electrode layers was measured for Examples 1 to 9 and Comparative Example 1. Continuity modulus was determined by embedding a fired multilayer ceramic capacitor in resin and polishing the multilayer ceramic capacitor to the central portion, thereby exposing the cross section. The cross section was observed with an SEM, about 10 images were taken, and the continuity modulus was measured from the taken images. The continuity modulus of Examples 1 to 9 was higher than that of Comparative Example 1. It is considered that this is because a large amount of the co-material remained in the internal electrode layers, and the contraction of the internal electrode layers was sufficiently delayed.

(Bondability) The bondability between the internal electrode layers and the external electrodes was examined for Examples 1 to 9 and Comparative Example 1. The state of connection between the internal electrode layers and the external electrodes was confirmed from a polished cross-sectional image in comparison with a multilayer ceramic capacitor in which no additive element was added to Ni. For example, in the case of a 200-layer stacked multilayer ceramic capacitor, if it was possible to confirm that the bonding state was improved by 15% or more compared to the multilayer ceramic capacitor in which no additive metal element was added to Ni, the bondability was judged to be very good "double circle". If the improvement of the bonding state by 10% or more was confirmed, the bondability was judged to be good "○". If it was less than 10% or the same level as the multilayer ceramic capacitor in which no additive metal element was added to Ni, the bondability was judged to be bad "-". The bondability of Comparative Example 1 was judged to be bad. It is considered that this was because no additive metal element was added. Note that the bonding state expressed here indicates a state in which the internal electrode and the external electrode are connected on the polished cross-sectional image. In contrast, in Examples 1 to 9, the bondability was judged to be very good or good. It is considered that this was because the additive metal element was diffused by making the additive metal element concentration in the internal electrode layer higher than the additive metal element concentration in the external electrode layer.

(Capacity) The capacity was measured for each of Examples 1 to 9 and Comparative Example 1. The capacity was measured using an LCR meter under conditions of 0.5 V and 1 kHz, and the average value of 100 samples was calculated. If the average capacity value was improved by 10% or more compared to the multilayer ceramic capacitor in which no additive metal element was added to Ni, the capacity was judged to be very good "double circle". If the average capacity value was improved by 5% or more and less than 10%, the capacity was judged to be good "○". If the average capacity value was improved by less than 5%, the capacity was judged to be bad "-". In Comparative Example 1, the capacity was determined to be bad. In contrast, in Examples 1 to 9, the capacity was judged to be very good or good. It is considered that this was because the continuity modulus of the internal electrode layers was higher than that of Comparative Example 1, and the bondability between the internal electrode layers and the external electrodes was also good.

(Reliability) The reliability was examined for each of Examples 1 to 9 and Comparative Example 1. Reliability was determined by performing a HALT test at 6V-125° C. For the HALT life, an average value of 100 samples was calculated. If the average value of life is more than twice that of the multilayer ceramic capacitor in which no additive metal element was added to N, the reliability was judged to be very good "double circle". If the average value of life was 1.5 times or more, the reliability was judged to be good "○". If the average value of life was equal to or less than 1.5 times, the reliability was judged to be bad "-". The reliability of Comparative Example 1 was judged to be bad. In contrast, the reliability of Examples 1 to 9 was judged to be very good or good. It is considered that this was because the bondability between the internal electrode layers and the external electrodes was also better than in Comparative Example 1. Table 1 and Table 2 show the results.

TABLE 1

| | INTERNAL ELECTRODE LAYER | ADDITIVE ELEMENT 1 | 2 | 3 | AMOUNT OF ADDITIVE ELEMENT (at %) | SLOPE m | RATIO IN END MARGIN |
|---|---|---|---|---|---|---|---|
| EXAMPLE 1 | Ni | Au | | | 1.0 | 4.64 | 0.52 |
| EXAMPLE 2 | Ni | Sn | | | 1.0 | 3.90 | 0.28 |
| EXAMPLE 3 | Ni | Cr | | | 1.0 | 4.56 | 0.51 |
| EXAMPLE 4 | Ni | Fe | | | 1.0 | 3.80 | 0.43 |
| EXAMPLE 5 | Ni | Y | | | 1.0 | 3.95 | 0.44 |
| EXAMPLE 6 | Ni | In | | | 1.0 | 3.85 | 0.43 |
| EXAMPLE 7 | Ni | Au | Sn | | 0.5/1.0 | 4.77 | 0.53 |
| EXAMPLE 8 | Ni | Au | Cr | | 0.5/1.0 | 4.66 | 0.52 |
| EXAMPLE 9 | Ni | Au | Sn | Cr | 0.5/0.5/1.0 | 4.79 | 0.54 |
| COMPARATIVE EXAMPLE 1 | Ni | | | | | 6.39 | — |

TABLE 2

| | CONTINUITY MODULUS | BOND-ABILITY | CAPACITY | RELI-ABILITY |
|---|---|---|---|---|
| EXAMPLE 1 | 92.1 | ◎ | ◎ | ◎ |
| EXAMPLE 2 | 89.3 | ○ | ○ | ◎ |
| EXAMPLE 3 | 95.3 | ◎ | ◎ | ○ |
| EXAMPLE 4 | 92.3 | ◎ | ○ | ○ |
| EXAMPLE 5 | 89.8 | ○ | ○ | ○ |
| EXAMPLE 6 | 87.8 | ○ | ○ | ○ |
| EXAMPLE 7 | 89.2 | ◎ | ○ | ◎ |
| EXAMPLE 8 | 93.6 | ◎ | ◎ | ◎ |
| EXAMPLE 9 | 96.9 | ◎ | ◎ | ◎ |
| COMPARATIVE EXAMPLE 1 | 85.0 | — | — | — |

(Example 10) A stack unit was obtained by forming a dielectric green sheet containing barium titanate as a dielectric material and printing an internal electrode pattern containing Ni powder and a co-material. 200 numbers of stack units were stacked, crimped and cut. After the binder was removed, a metal paste for external electrodes containing Ni powder, a co-material, and an additive metal element was applied to the two end faces of the stack units and fired in a reducing atmosphere. $BaTiO_3$ was used as a co-material for the internal electrode pattern and the metal paste. Au was used as the additive metal element of the metal paste for the external electrodes. The amount of Au added to the metal paste was set to 1.0 at % when Ni was assumed to be 100 at %.

The thickness of the dielectric layer after firing was 0.6 μm, and the thickness of the internal electrode layer was 0.7 μm. After firing, (concentration of additive metal element in internal electrode layer)/(concentration of additive metal element in external electrode before forming plating layer) at the end margin was 0.52. The end margin is a part of the end margin 15 illustrated in FIG. 2. The additive metal element was detected by EDS (energy dispersive X-ray spectroscopy), and (amount of additive metal element detected in internal electrode layer)/(detected amount of additive metal element in external electrode) was used as the ratio. The EDS analysis in this case was a point analysis, and the detected amount was the detected amount at a predetermined irradiation point. The slope "m" of the graph calculated from the diameter and volume distribution of the co-material was 4.64.

(Example 11) In Example 11, Sn was used as the additive metal element. The amount of Sn added to the metal paste for external electrodes was set to 1.0 at % when Ni was assumed to be 100 at %. Other conditions were the same as in Example 10.

The thickness of the dielectric layer after firing was 0.6 μm, and the thickness of the internal electrode layer was 0.7 μm. After firing, (concentration of additive metal element in internal electrode layer)/(concentration of additive metal element in external electrode before forming plated layer) at the end margin was 0.28. The slope" "m of the graph calculated from the diameter and volume distribution of the co-material was 3.90.

(Example 12) In Example 12, Cr was used as the additive metal element. The amount of Cr added to the metal paste for external electrodes was set to 1.0 at % when Ni was assumed to be 100 at %. Other conditions were the same as in Example 10.

The thickness of the dielectric layer after firing was 0.6 μm, and the thickness of the internal electrode layer was 0.7 μm. After firing, (concentration of additive metal element in internal electrode layer)/(concentration of additive metal element in external electrode before forming plated layer) at the end margin was 0.51. The slope "m" of the graph calculated from the diameter and volume distribution of the co-material was 4.56.

(Example 13) In Example 13, Fe was used as the additive metal element. The amount of Fe added to the metal paste for external electrodes was set to 1.0 at % when Ni was assumed to be 100 at %. Other conditions were the same as in Example 10.

The thickness of the dielectric layer after firing was 0.6 μm, and the thickness of the internal electrode layer was 0.7 μm. After firing, (concentration of additive metal element in internal electrode layer)/(concentration of additive metal element in external electrode before forming plating layer) at the end margin was 0.43. The slope "m" of the graph calculated from the diameter and volume distribution of the co-material was 3.80.

(Example 14) In Example 14, Y was used as the additive metal element. The amount of Y added to the metal paste for the external electrodes was set to 1.0 at % when Ni was assumed to be 100 at %. Other conditions were the same as in Example 10.

The thickness of the dielectric layer after firing was 0.6 μm, and the thickness of the internal electrode layer was 0.7 μm. After sintering, (concentration of additive metal element in internal electrode layer)/(concentration of additive metal element in external electrode before forming plated layer) at the end margin was 0.44. The slope "m" of the graph calculated from the diameter and volume distribution of the co-material was 3.95.

(Example 15) In Example 15, In was used as the additive metal element. The amount of In added to the metal paste for external electrodes was set to 1.0 at % when Ni was assumed to be 100 at %. Other conditions were the same as in Example 10.

The thickness of the dielectric layer after firing was 0.6 μm, and the thickness of the internal electrode layer was 0.7 μm. After firing, (concentration of additive metal element in internal electrode layer)/(concentration of additive metal element in external electrode before forming plated layer) at the end margin was 0.43. The slope “m” of the graph calculated from the diameter and volume distribution of the co-material was 3.85.

(Example 16) In Example 16, Au and Sn were used as the additive metal elements. The amounts of Au and Sn added to the metal paste for external electrodes were set to 0.5 at % and 1.0 at %, respectively, assuming 100 at % of Ni. Other conditions were the same as in Example 10.

The thickness of the dielectric layer after firing was 0.6 μm, and the thickness of the internal electrode layer was 0.7 μm. After sintering, (concentration of additive metal element in internal electrode layer)/(concentration of additive metal element in external electrode before forming plated layer) at the end margin was 0.53. The slope “m” of the graph calculated from the diameter and volume distribution of the co-material was 4.77.

(Example 17) In Example 17, Au and Cr were used as the additive metal elements. The amounts of Au and Cr added to the metal paste for external electrodes were set to 0.5 at % and 1.0 at %, respectively, assuming 100 at % of Ni. Other conditions were the same as in Example 10.

The thickness of the dielectric layer after firing was 0.6 μm, and the thickness of the internal electrode layer was 0.7 μm. After firing, (concentration of additive metal element in internal electrode layer)/(concentration of additive metal element in external electrode before forming plated layer) at the end margin was 0.52. The slope “m” of the graph calculated from the diameter and volume distribution of the co-material was 4.66.

(Example 18) In Example 18, Au, Sn, and Cr were used as additive metal elements. The amounts of Au, Sn, and Cr added to the metal paste for external electrodes were set to 0.5 at %, 0.5 at %, and 1.0 at %, respectively, assuming 100 at % of Ni. Other conditions were the same as in Example 10.

The thickness of the dielectric layer after firing was 0.6 μm, and the thickness of the internal electrode layer was 0.7 μm. After firing, (concentration of additive metal element in internal electrode layer)/(concentration of additive metal element in external electrode before forming plated layer) at the end margin was 0.54. The slope “m” of the graph calculated from the diameter and volume distribution of the co-material was 4.79.

(Comparative Example 2) In Comparative Example 2, no additive metal element was added to the metal paste for the external electrodes. Other conditions were the same as in Example 10.

The thickness of the dielectric layer after firing was 0.6 μm, and the thickness of the internal electrode layer was 0.7 μm. The slope “m” of the graph calculated from the diameter and volume distribution of the co-material was 6.39.

Figure 14A:
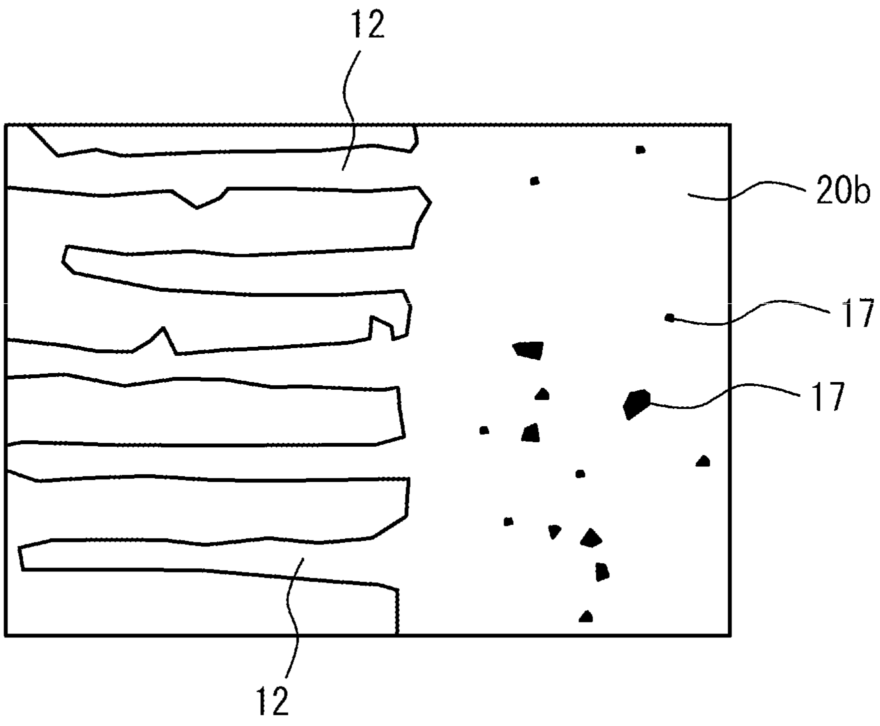
FIG. 14A is a diagram obtained by tracing a SEM photograph of a cross section in a stacking direction of Example 10.
Figure 14B:
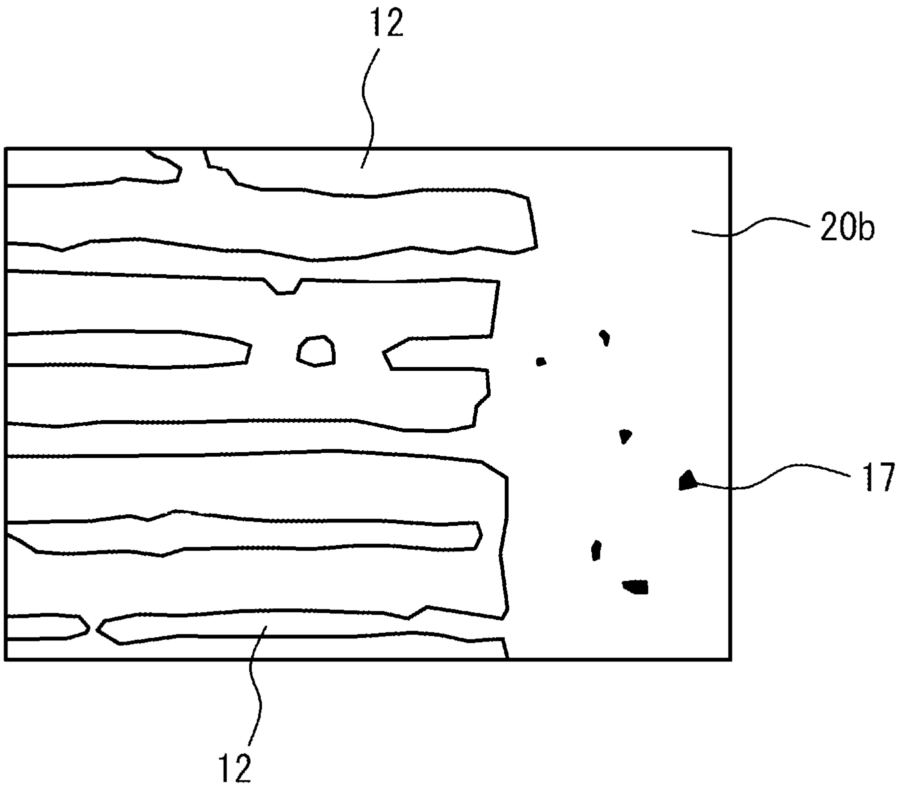
FIG. 14B is a diagram obtained by tracing a SEM photograph of a cross section in a stacking direction of Comparative Example 2.

FIG. 14A is a diagram obtained by tracing a cross-sectional SEM photograph of the external electrode of Example 10. FIG. FIG. 14B is a diagram obtained by tracing a cross-sectional SEM photograph of the external electrode of Comparative Example 2. In comparison with FIG. 14B, it can be seen that much of the co-material 17 remains in the external electrodes in FIG. 14A.

Figure 15:
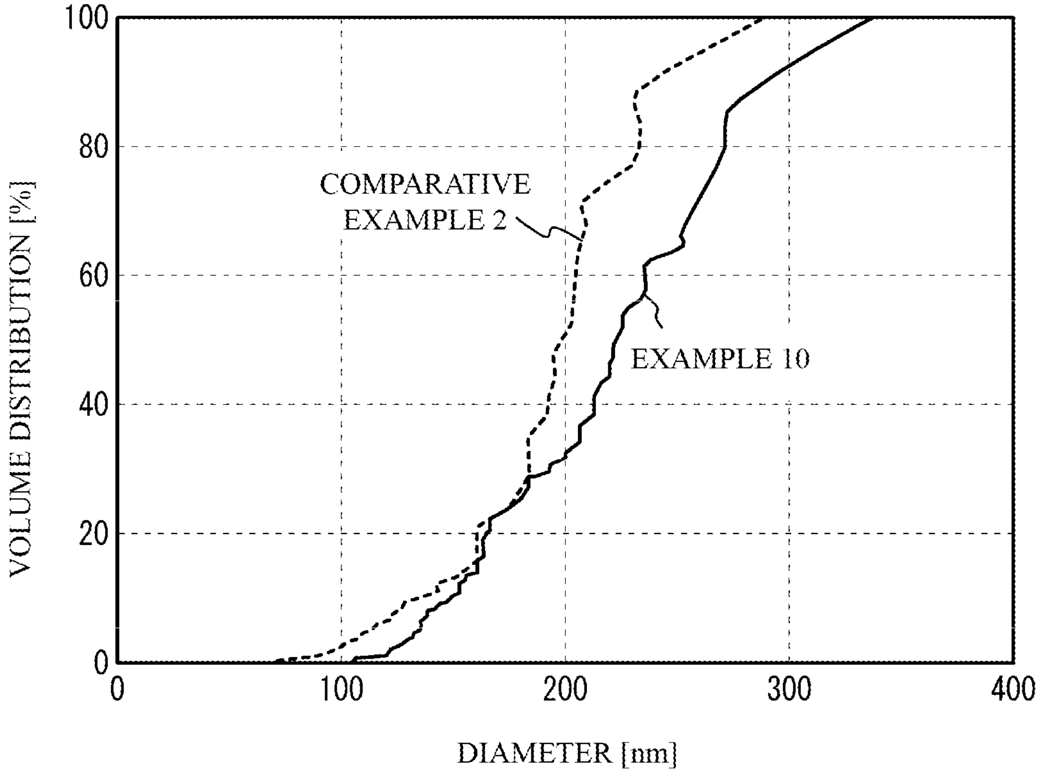
FIG. 15 is a graph calculated from a diameter and volume distribution of a co-material for Example 10 and Comparative Example 2.

FIG. 15 is a graph calculated from the diameter and volume distribution of the co-material in the external electrodes for Example 10 and Comparative Example 2. As shown in FIG. 15, it can be seen that the slope “m” is smaller in Example 10 than in Comparative Example 2. Therefore, it can be seen that a larger amount of co-material remains in Example 10 than in Comparative Example 2. It is considered that this was because the additive metal element was added to the metal paste for the external electrodes. In Comparative Example 2, 500 co-materials were counted. And in Example 10, 500 co-materials were counted.

(Bondability) For Examples 10 to 18 and Comparative Example 2, the bondability between the internal electrode layer and the external electrode was examined. The state of connection between the internal electrode layers and the external electrodes was confirmed from polished cross-sectional images in comparison with a multilayer ceramic capacitor in which no additive metal element was added to Ni. For example, in the case of a 200-layer multilayer ceramic capacitor, if it was possible to confirm that the bonding state was improved by 15% or more compared to the multilayer ceramic capacitor in which no additive metal element was added to N, the bondability was judged to be very good “double circle”. If the improvement of the bonding state by 10% or more can be confirmed, the bondability was judged to be good “○”. If the improvement was less than 10% or the same level as the multilayer ceramic capacitor in which no additive metal element was added to Ni, the bondability was judged to be bad “-”. In Comparative Example 2, the bondability was judged to be bad. It is thought that this was because the additive metal element diffused more than in Comparative Example 2 because the additive metal element concentration in the external electrode was higher than the additive metal element concentration in the internal electrode layer. Note that the bonding state expressed here indicates a state in which the internal electrode and the external electrode are connected on the polished cross-sectional image.

(Presence or absence of cracks) For each of Examples 10 to 18 and Comparative Example 2, 3000 samples were examined for cracks. A stereoscopic microscope was used to confirm the position of crack generation. If the sample occurrence rate was 0% (if no cracks were found), it was determined that cracks were not present, and if even one crack was found, cracks were determined to be present. In Comparative Example 2, cracks were determined to be “presence”. It is believed that this was because in Comparative Example 2, no additive metal element was added to the metal paste for the external electrodes, so that the sintering delay effect was not obtained. On the other hand, in Examples 10 to 18, crack generation was judged to be “absence”. It is thought that this was because in Examples 10 to 18, the sintering delay effect was sufficiently obtained by adding the additive metal element to the metal paste for the external electrodes.

(Capacity) The capacity was measured for each of Examples 10 to 18 and Comparative Example 2. The capacity was measured using an LCR meter under conditions of 0.5 V and 1 kHz, and the average value of 100 samples was calculated. If the average capacity value was improved by 10% or more compared to the multilayer ceramic capacitor in which no additive metal element was added to N, the capacity was judged to be very good “double circle”. If the average capacity value was improved by 5% or more and less than 10%, the capacity was judged to be good “○”. If the average capacity value was improved by less than 5%, the capacity was judged to be bad “-”. In Comparative Example 2, the capacity was judged to be bad. In contrast, in Examples 10 to 18, the capacity was judged to very good or good. It is considered that this was because the continuity modulus of the internal electrode layers was higher than in Comparative Example 2, and the bondability between the internal electrode layers and the external electrodes was also good.

(Reliability) The reliability of each of Examples 10 to 18 and Comparative Example 2 was examined. Reliability was determined by performing a HALT test at 6V-125° C. For the HALT life, an average value of 100 samples was calculated. If the average value of life was more than twice that of the multilayer ceramic capacitor in which no additive metal element was added to Ni, the reliability was judged to be very good “double circle”. If the average value of life was 1.5 times or more, the reliability was judged to be good “○”. If the average value of life was the same or improved by less than 1.5 times, the reliability was judged to be bad “-”. In Comparative Example 2, the reliability was judged to be bad. In contrast, in Examples 10 to 18, the reliability was judged to be very good or good. It is thought that this was because the bondability between the internal electrode layers and the external electrodes was better than in Comparative Example 2. Table 3 and Table 4 show the results.

TABLE 3

| | EXTERNAL ELECTRODE | ADDITIVE ELEMENT 1 | 2 | 3 | AMOUNT OF ADDITIVE ELEMENT (at %) | SLOPE m | RATIO IN END MARGIN |
|---|---|---|---|---|---|---|---|
| EXAMPLE 10 | Ni | Au | | | 1.0 | 4.64 | 0.52 |
| EXAMPLE 11 | Ni | Sn | | | 1.0 | 3.90 | 0.28 |
| EXAMPLE 12 | Ni | Cr | | | 1.0 | 4.56 | 0.51 |
| EXAMPLE 13 | Ni | Fe | | | 1.0 | 3.80 | 0.43 |
| EXAMPLE 14 | Ni | Y | | | 1.0 | 3.95 | 0.44 |
| EXAMPLE 15 | Ni | In | | | 1.0 | 3.85 | 0.43 |
| EXAMPLE 16 | Ni | Au | Sn | | 0.5/1.0 | 4.77 | 0.53 |
| EXAMPLE 17 | Ni | Au | Cr | | 0.5/1.0 | 4.66 | 0.52 |
| EXAMPLE 18 | Ni | Au | Sn | Cr | 0.5/0.5/1.0 | 4.79 | 0.54 |
| COMPARATIVE EXAMPLE 2 | Ni | | | | | 6.39 | — |

[Table 4]

TABLE 4

| | BODABILITY | CRACK | CAPACITY | RELI-ABILITY |
|---|---|---|---|---|
| EXAMPLE 10 | ◎ | NO | ◎ | ◎ |
| EXAMPLE 11 | ○ | NO | ○ | ◎ |
| EXAMPLE 12 | ◎ | NO | ◎ | ○ |
| EXAMPLE 13 | ◎ | NO | ○ | ○ |
| EXAMPLE 14 | ○ | NO | ○ | ○ |
| EXAMPLE 15 | ○ | NO | ○ | ○ |
| EXAMPLE 16 | ◎ | NO | ○ | ◎ |
| EXAMPLE 17 | ◎ | NO | ◎ | ◎ |
| EXAMPLE 18 | ◎ | NO | ◎ | ◎ |
| COMPARATIVE EXAMPLE 2 | — | YES | — | — |

Although the embodiments of the present invention have been described in detail, it is to be understood that the various change, substitutions, and alterations could be made hereto without departing from the spirit and scope of the invention.

What is claimed is:

1. A ceramic electronic device comprising:

a multilayer chip in which each of a plurality of dielectric layers of which a main component is a ceramic and each of a plurality of internal electrode layers including Ni as a main component are alternately stacked, the multilayer chip having a rectangular parallelepiped shape, each of the plurality of internal electrode layers being exposed to two end faces opposite to each other; and external electrodes that are respectively provided on the two end faces and have a main component of Ni and a sub metal element other than Ni, wherein all the plurality of internal electrode layers include the sub metal element other than Ni, and co-materials, wherein a concentration of the sub metal element in the plurality of internal electrode layers is higher than a concentration of the sub metal element in the external electrodes which is more than zero, wherein the sub metal element is a metal element exclusive of Pt, wherein the concentration of the sub metal element in the plurality of internal electrode layers is more than 0.1 at % and 5.0 at % or less with respect to Ni, and wherein a ratio of the concentration of the sub metal element in the external electrodes to the concentration of the sub metal element in the plurality of internal electrode layers is 0.1 or more and 0.5 or less.

2. The ceramic electronic device as claimed in claim 1, wherein the sub metal element is one or more selected from the group consisting of Au, Sn, Cr, Fe, Y, In, As, Co, Cu, Ir, Mg, Os, Pd, Re, Rh, Ru, Se, Te, Zn and Ge.

3. The ceramic electronic device as claimed in claim 1, wherein, in the plurality of internal electrode layers, a slope “m” is 3.8 or more and 5.0 or less, when a diameter of each of the co-materials is taken on a horizontal axis, a volume distribution (%) is taken on a vertical axis so that a total volume of each of the co-materials is 100%, and a 20% value and a 80% value of an obtained graph are linearly approximated.

4. The ceramic electronic device as claimed in claim 1, wherein the concentration of the sub metal element of the plurality of internal electrode layers is higher than the concentration of the sub metal element of the external electrodes, in an end margin in which a set of the plurality of internal electrode layers connected to one external electrode face each other without sandwiching internal electrode layers connected to another external electrode.

5. The ceramic electronic device as claimed in claim 1, wherein a thickness of each of the plurality of dielectric layers is 0.8 μm or less.

6. The ceramic electronic device as claimed in claim 1, wherein a thickness of each of the plurality of internal electrode layers is 0.8 μm or less.

7. The ceramic electronic device as claimed in claim 1, wherein the external electrodes include the co-materials.

8. The ceramic electronic device as claimed in claim 1, wherein the external electrodes and the multilayer chip are simultaneously sintered.

9. The ceramic electronic device as claimed in claim 1, wherein the concentration of the sub metal element in the plurality of internal electrode layers is 1.0 at % or more and 5.0 at % or less with respect to Ni.

10. A ceramic electronic device comprising:

a multilayer chip in which each of a plurality of dielectric layers of which a main component is a ceramic and each of a plurality of internal electrode layers including Ni as a main component are alternately stacked, the multilayer chip having a rectangular parallelepiped shape, each of the plurality of internal electrode layers being exposed to two end faces opposite to each other; and external electrodes that are respectively provided on the two end faces and have a main component of Ni and a sub metal element other than Ni, wherein all the plurality of internal electrode layers include the sub metal element other than Ni, and co-materials, wherein a concentration of the sub metal element in the plurality of internal electrode layers is higher than a concentration of the sub metal element in the external electrodes which is more than zero, wherein the sub metal element is a metal element exclusive of Pt, wherein the concentration of the sub metal element in the plurality of internal electrode layers is 1.0 at % or more and 5.0 at % or less with respect to Ni.

* * * * *